(12) United States Patent
Seeley et al.

(10) Patent No.: US 10,157,316 B2
(45) Date of Patent: Dec. 18, 2018

(54) INTERACTIVE TOUCH SCREEN DEVICE FOR WINE

(71) Applicant: Whirlpool Corporation, Benton Harbor, MI (US)

(72) Inventors: Michael S. Seeley, South Haven, MI (US); Kirk W. Goodwin, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 182 days.

(21) Appl. No.: 13/832,428

(22) Filed: Mar. 15, 2013

(65) Prior Publication Data

US 2014/0126829 A1    May 8, 2014

Related U.S. Application Data

(63) Continuation-in-part of application No. 13/668,548, filed on Nov. 5, 2012.

(51) Int. Cl.
*G06K 9/00* (2006.01)

(52) U.S. Cl.
CPC ..... *G06K 9/00671* (2013.01); *G06K 2209/17* (2013.01)

(58) Field of Classification Search
None
See application file for complete search history.

(56) References Cited

U.S. PATENT DOCUMENTS

| 5,831,862 | A * | 11/1998 | Hetrick | G07F 9/026 221/8 |
| 8,417,376 | B1 * | 4/2013 | Smolen | G07F 11/002 221/155 |
| 8,438,084 | B1 * | 5/2013 | Tesler | G06Q 10/087 705/29 |

(Continued)

FOREIGN PATENT DOCUMENTS

| CN | 102479287 A | 5/2012 |
| KR | 20060098648 | 10/2006 |

(Continued)

OTHER PUBLICATIONS

Eno Toppe, Martin R. Oswald, Daniel Cremers, Carsten Rother, "Image-Based 3D Modeling via Cheeger Sets", Nov. 12, 2010, Springer, 10th Asian Conference on Computer Vision, Queenstown, New Zealand, Nov. 8-12, 2010, pp. 53-64.*

(Continued)

*Primary Examiner* — Robert Bader
(74) *Attorney, Agent, or Firm* — Diedericks & Whitelaw, PLC

(57) ABSTRACT

Interactive display and rendering device, system and method for wine bottles. are disclosed. An interactive wine management and display device and method using a scanning instrument capable of scanning information regarding a bottle of wine; an imaging instrument capable of collecting an image of at least a portion of a bottle of wine; a connection to a wine database containing information regarding wines; a connection to a database having images of wine bottles. The device is able to render the images as well as information on the wine to a display for user interaction.

8 Claims, 30 Drawing Sheets

(56) References Cited

U.S. PATENT DOCUMENTS

| | | | | |
|---|---|---|---|---|
| 9,142,078 | B2* | 9/2015 | Lin | G07F 9/023 |
| 9,147,207 | B2* | 9/2015 | Haaramo | G06T 19/00 |
| 2002/0010655 | A1* | 1/2002 | Kjallstrom | 705/27 |
| 2003/0154141 | A1* | 8/2003 | Capazario | G06Q 10/087 705/26.1 |
| 2006/0164333 | A1* | 7/2006 | Robertson | 345/44 |
| 2007/0143190 | A1 | 6/2007 | Banerjee | |
| 2007/0162335 | A1 | 7/2007 | Banerjee | |
| 2007/0162357 | A1 | 7/2007 | Banerjee | |
| 2007/0191983 | A1* | 8/2007 | Griffits et al. | 700/213 |
| 2008/0077511 | A1* | 3/2008 | Zimmerman | G06Q 10/00 705/28 |
| 2010/0039513 | A1* | 2/2010 | Glickman | G06Q 10/087 348/143 |
| 2010/0235406 | A1 | 9/2010 | Williams et al. | |
| 2011/0166694 | A1 | 7/2011 | Griffits | |
| 2012/0285089 | A1* | 11/2012 | Artwohl | A47F 3/0434 49/70 |

FOREIGN PATENT DOCUMENTS

| | | | |
|---|---|---|---|
| KR | 20060101265 | | 10/2006 |
| KR | 20080032567 | A | 4/2008 |
| WO | WO 2004016885 | A1 * | 2/2004 |

OTHER PUBLICATIONS

Michael Schmitz, Jorg Baus, Robert Dorr, "The Digital Sommelier: Interacting with Intelligent Products", Mar. 28, 2008, Springer, First International Conference, IOT 2008, Zurich, Switzerland, Mar. 26-28, 2008, pp. 247-262.*

Tomokazu Sato, Akihiko Iketani, Sei Ikeda, Msayuki Kanbara, Norboru Nakajima, Naokazu Yokoya, "Video Mosaicing for Curved Documents by Structure from Motion", 2006, ACM, Proceedings SIGGRAPH '06 ACM SIGGRAPH 2006 Sketches, Article No. 126.*

Eric A. Bier, Kenneth R. Sloan, Jr., "Two-Part Texture Mappings", Sep. 1986, IEEE, IEEE Computer Graphics and Applications, vol. 6, Issue 9, pp. 40-63.*

Tal Hassner, Ronen Basri, "Example Based 3D Reconstruction from Single 2D Images", 2006, IEEE, Proceedings of the 2006 Conference on Computer Vision and Pattern Recognition Workshop (CVPRW'06).*

Iddo Drori, Daniel Cohen-Or, Hezy Yeshurun, "Fragment-Based Image Completion", Jul. 2003, ACM, ACM Transactions on Graphics (TOG)—Proceedings of ACM SIGGRAPH 2003, vol. 22, Issue 3, pp. 303-312.*

Shenchang Eric Chen, Lance Williams, "View Interpolation for Image Synthesis", Aug. 6, 1993, ACM, SIGGRAPH '93 Proceedings of the 20th annual conference on computer graphics and interactive techniques, pp. 279-288.*

Lucas J Meeker, "What are some good options for fancy, over-the-top printing techniques for high-end wine labels?", Dec. 29, 2011, website, retreived from "https://www.quora.com/What-are-some-good-options-for-fancy-over-the-top-printing-techniques-for-high-end-wine-labels" on Mar. 7, 2018.*

Chunlin Wu, Jiansong Deng, Wenming Zhu, Falai Chen, "Inpainting images on Implicit Surfaces", 2005, Proc. 13th Pacific Conf. Computer Graphics and Applications (PG '05), pp. 142-144.*

Antonio Criminisi, Patrick Pérez, Kentaro Toyama, "Region Filling and Object Removal by Exemplar-Based Image Inpainting", Sep. 2004, IEEE, IEEE Transactions on Image Processing, vol. 13, No. 9, pp. 1200-1212.*

Marcelo Bertalmio, Luminita Vese, Guillermo Sapiro, Stanley Osher, "Simultaneous Structure and Texture Image Inpainting", Aug. 2003, IEEE, IEEE Transactions on Image Processing, vol. 12, No. 8, pp. 882-889.*

Aurélie Bugeau, Marcelo Bertalmio, Vicent Caselles, Guillermo Sapiro, "A Comprehensive Framework for Image Inpainting", Oct. 2010, IEEE, IEEE Transactions on Image Processing, vol. 19, No. 10, pp. 2634-2645.*

Iddo Drori, Daniel Cohen-Or, Hezy Yeshurun, "Fragment-Based Image Completion", Jul. 31, 2003, ACM, ACM Transactions on Graphics (TOG) TOG, vol. 22 Issue 3, pp. 303-312.*

* cited by examiner

INTERACTIVE TOUCH SCREEN DEVICE FOR WINE

CROSS REFERENCE TO RELATED CASES

This case is a continuation-in-part of SUB-02925-US-NP, entitled "INTERACTIVE TRANSPARENT TOUCH SCREEN DOORS FOR WINE CABINETS" which was filed on Nov. 5, 2012, was given the Ser. No. 13/668,548, and is currently pending.

FIELD OF THE DISCLOSURE

This disclosure relates generally to wine cabinets, and, more particularly, to interactive display and rendering device for wine bottles.

BACKGROUND

Wine cabinets, which are also known as wine coolers, wine refrigerators, or refrigerated wine cellars, are purpose-built appliances designed to keep multiple bottles of wine at a substantially optimum temperature and humidity. Wine cabinets include racks that hold bottles of wine at fixed locations. Wines have unique characteristics. Additionally wine bottles have unique labels that assist in the identification of the wine in the bottle. It would be advantageous to have a device, system and/or method that would assist in the identification, display and/or rendering of a wine bottle.

SUMMARY

An aspect of the present invention is an interactive wine management and display device and method using a scanning instrument capable of scanning information regarding a bottle of wine; an imaging instrument capable of collecting an image of at least a portion of a bottle of wine; a connection to a wine database containing information regarding wines; a connection to a database having images of wine bottles. The device is able to render the images as well as information on the wine to a display for user interaction. Additionally an aspect of the present invention is an interactive system for use with a wine cabinet or rack to hold bottles of wine including a scanning device which can assist in identify a bottle of wine, a wine database contains information about wines, an image database, containing images of wine bottles, and a display device capable of displaying information from wine database regarding a wine bottle and rendering an associated image of the wine bottle.

DETAILED DESCRIPTION

Figure 1:
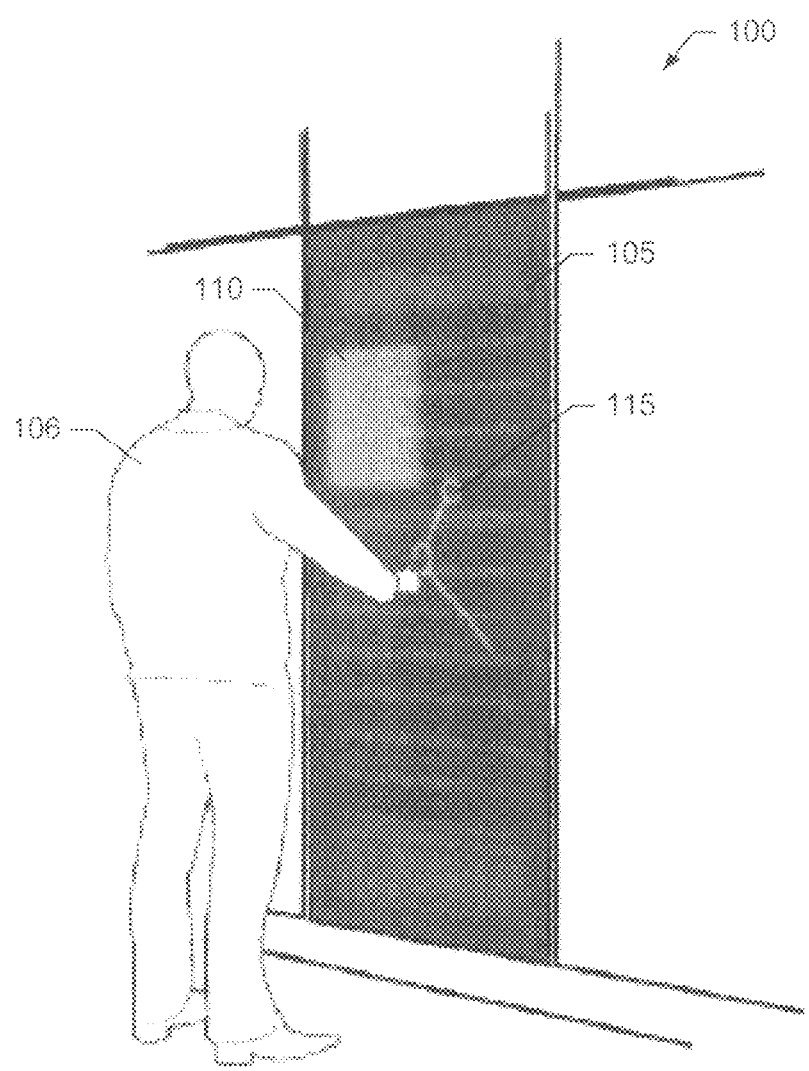
FIG. 1 is a pictorial representation of a wine cabinet having an interactive transparent touch screen door.

FIG. 1 illustrates an example wine cabinet 100 featuring an interactive transparent touch screen door 105. As shown in FIG. 1, a user 106 can interact with the wine cabinet 100 by touching the door 105 and/or viewing information 110 displayed on the door 105. The information 110 may include one or more menus, information about a particular bottle of wine (e.g., location of origin, vineyard, type, food pairing, price, image(s) of label, peak, etc.), and/or indicators (e.g., a circle 115) having locations that physically correspond to the locations of bottles of wine. For example, the user 106 may interact with one or more menus presented on the door 105 to provide one or more wine selection criteria. Wines matching the one or more wine selection criteria can be identified on the door 105 by displaying a circle 115, or some other indicator, at the physical location(s) of the matching wine(s). The door 105 is transparent to enable the user 106 to view the contents of the wine cabinet 100 even while the door 105 is being used. The interactive nature of the door 105 enables the user to virtual interact with the bottles of wine stored in the wine cabinet without having to physical disturb or remove a bottle of wine from the wine cabinet 100. The wine cabinet 105 shares many features of a conventional wine cabinet, which will not be described in detail herein except as necessary for a complete understanding. Moreover, while the wine cabinet 100 depicted in FIG. 1 is a built-in wine cabinet, it will be appreciated that the interactive transparent touch screen doors disclosed herein are applicable to wine cabinets having other form factors.

Figure 2:
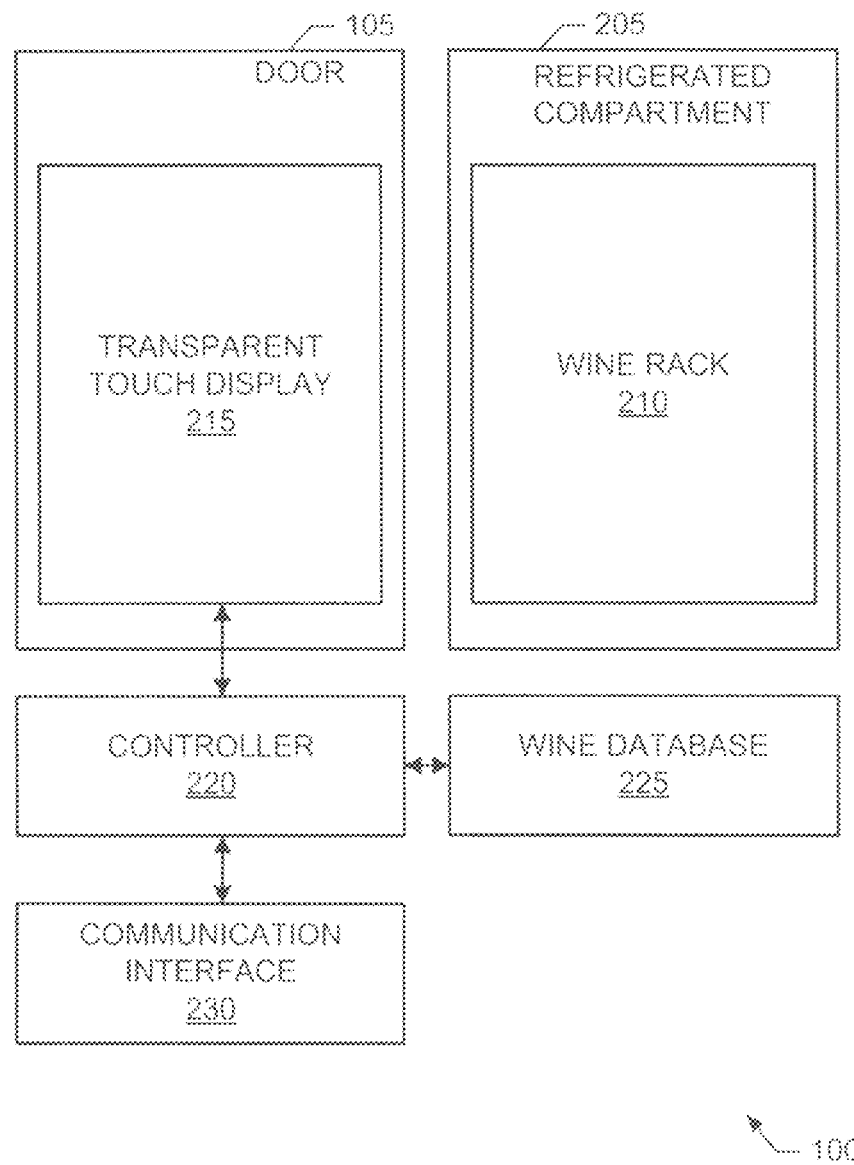
FIG. 2 is a schematic diagram of an example manner of implementing the example wine cabinet of FIG. 1.

As shown in FIG. 2, the wine cabinet 100 includes a refrigerated compartment 205 for refrigerating bottles of wine. The refrigerated compartment 205 has an open face to provide access to the refrigerated compartment 205. The interactive transparent touch screen door 105 is moveably mounted to the wine cabinet 100 for movement between opened and closed positions to selectively open and close the open face of the refrigerated compartment 205. To hold bottles of wine, the refrigerated compartment 205 includes a wine rack 210.

To enable a user to view information and interact with the interactive transparent touch screen door 105, the interactive transparent touch screen door 105 includes an embedded transparent touch display 215 such as a transparent touch organic light-emitting diode (OLED) display. That is, the touch display 215 is an integral part of the touch screen door 105. Because, the touch display 215 is transparent, contents of the wine cabinet 105 can be viewed even while information is displayed on the door 105 by the touch display 215. Preferably, the touch display 215 is sized to at least correspond to an extent of the refrigerated compartment 205 corresponding to the wine rack 210. Thus, the touch display 215 is able to display location information for any bottle of wine stored in the wine cabinet 105. Of course, the touch display 215 may be sized to be larger or smaller than the wine rack 210.

To control the touch display 215, the wine cabinet 100 includes a controller 220. The controller 220 may be implemented by one or more Intel®, AMD®, and/or ARM® microprocessors. Of course, other processors from other processor families and/or manufacturers are also appropriate. The controller 220 executes coded instructions present in a main memory of the controller 220.

To store information representing wine stored in the wine cabinet 100, the wine cabinet 100 may include a wine database 225. Information may be stored in the wine database 225 using any number and/or type(s) of table(s) and/or data structure(s). As discussed below in connection with FIGS. 8, 9 and 10, the wine database 225 may alternatively be stored in a handheld computing device 800 communicatively coupled to the wine cabinet 100. Example information that may be stored in the wine database 225 includes, but is not limited to, location of origin, vineyard, type, food pairing, price, image(s) of label, and peak.

To communicatively couple the wine cabinet 100 to other devices, the wine cabinet 100 may include any number and/or type(s) of communication interface(s) 230 such as a Bluetooth interface, a wireless local area network (WLAN) interface, etc. A handheld computing device (e.g., the handheld computing device 800) communicatively coupled to the wine cabinet 100 via the communication interface 230 can direct the controller 220 to present information associated with wine stored in the wine cabinet 100 and/or wine location information on the touch display 215.

While an example wine cabinet 100 is illustrated in FIG. 2, any of the illustrated devices may be combined, divided, re-arranged, omitted, eliminated and/or implemented in any other way. Moreover, the wine cabinet 100 may include devices instead of, or in addition to, those illustrated in FIG. 2, and/or may include more than one of any or all of the illustrated interfaces, elements and/or devices.

Figure 3:
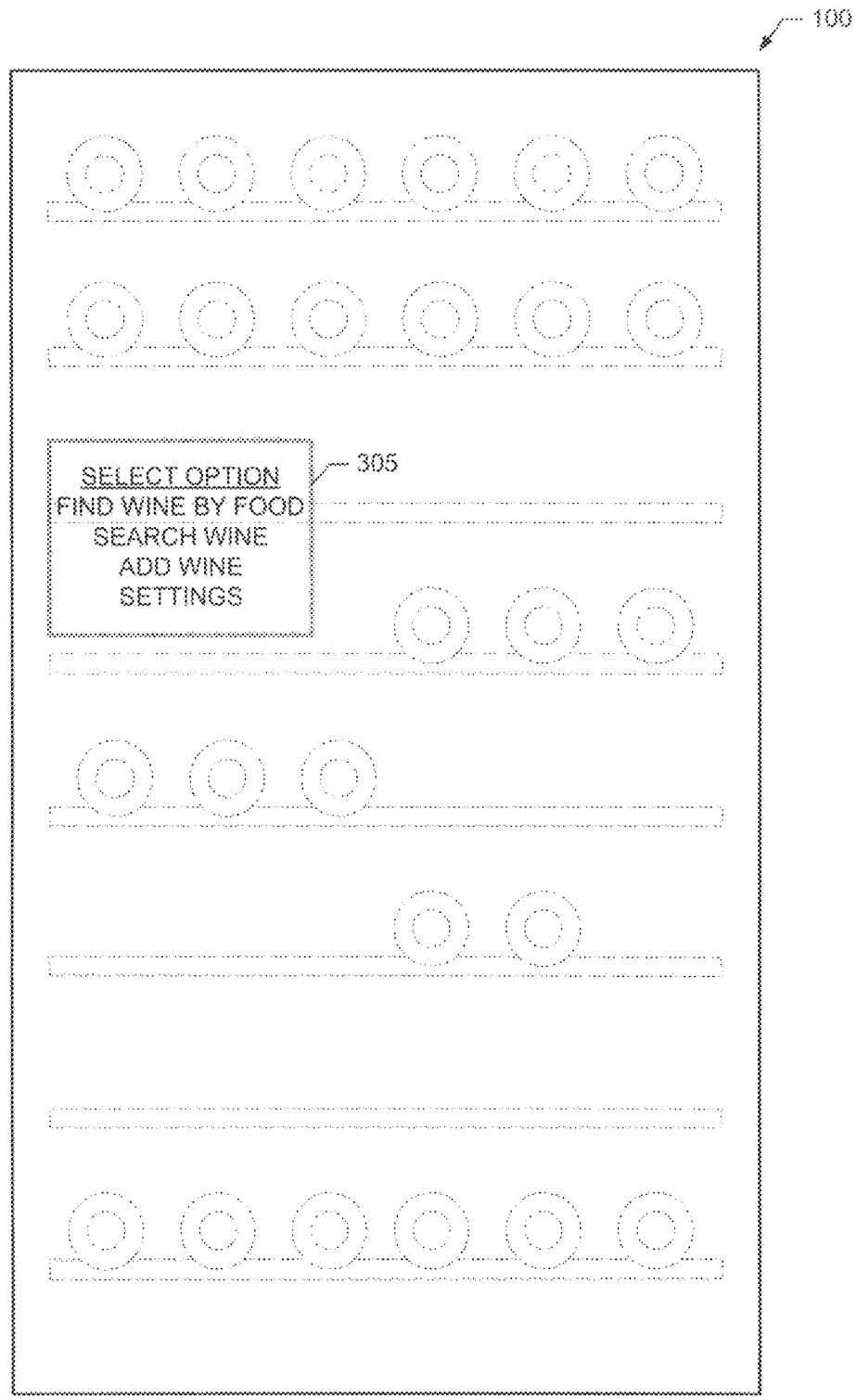
FIG. 3 is a pictorial representation of an example menu displayed by the example interactive transparent touch screen door of FIGS. 1 and 2.

FIG. 3 is a pictorial representation of an example menu 305 displayed by the example touch display 215 after the user 106 has touched the door 105 to activate the touch display 215. Because the door 105 and touch display 215 are transparent, contents of the refrigerated compartment 205 (depicted with dashed lines) remain viewable through the door 105 and the menu 305. The user 106 can select any of the displayed options by touching on or near a corresponding location on the touch screen 215. For example, to find a wine based on a food to be served, the user 106 touches on or near the portion of the touch display 215 corresponding to the phrase "Find Wine By Food."

FIGS. 4A-4E are a pictorial representation of an example usage of the example interactive transparent touch screen door 105 to search for and obtain information associated with a bottle of wine. The example usage of FIGS. 4A-4E may be activated when, for example, the user 106 touches on or near the portion of the example menu 305 of FIG. 3 corresponding to the phrase "Find Wine By Food."

Figure 4A:
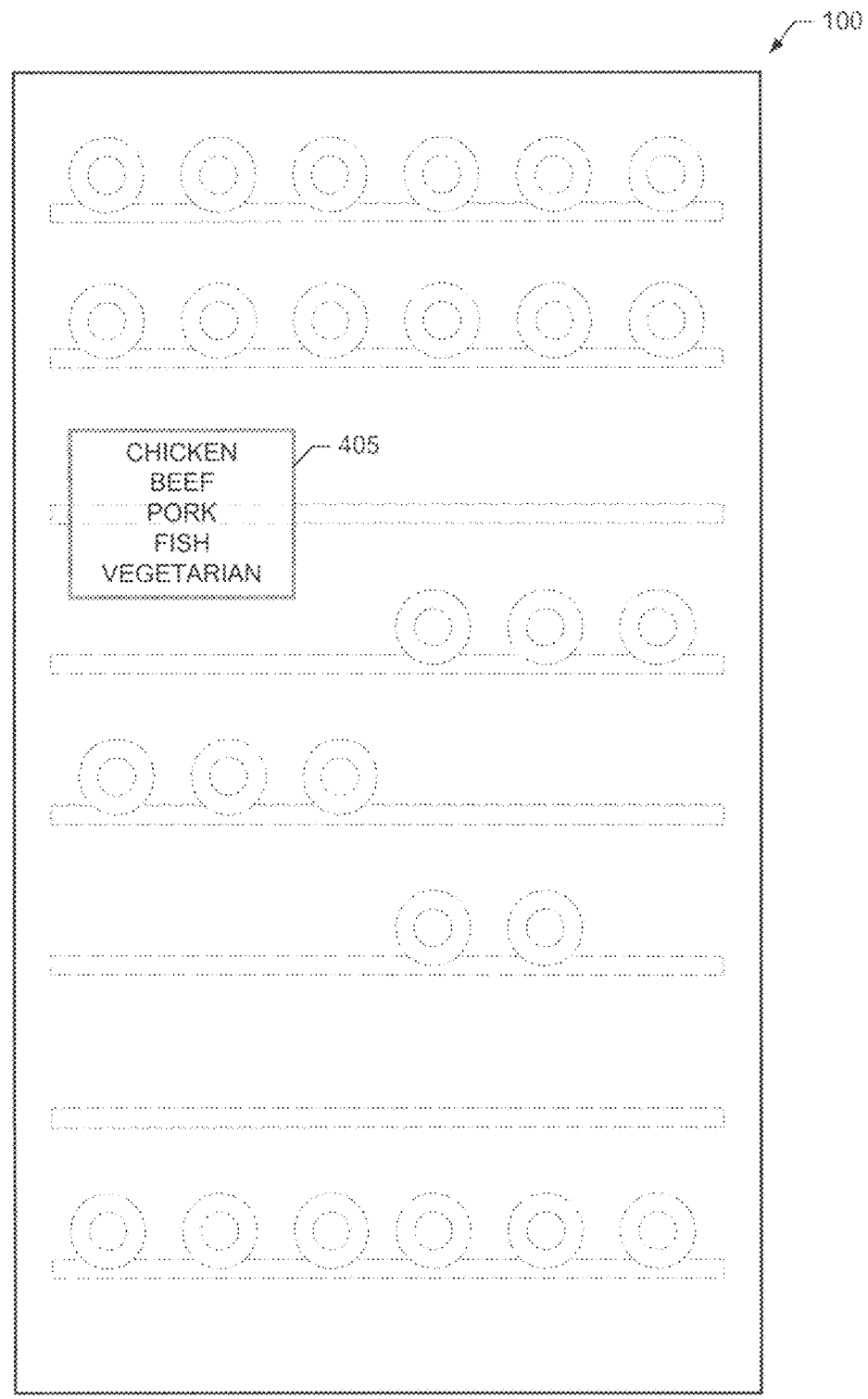
FIGS. 4A-4E are pictorial representations of an example usage of the example interactive transparent touch screen door of FIGS. 1 and 2 to search for and obtain information associated with a bottle of wine.
Figure 4B:
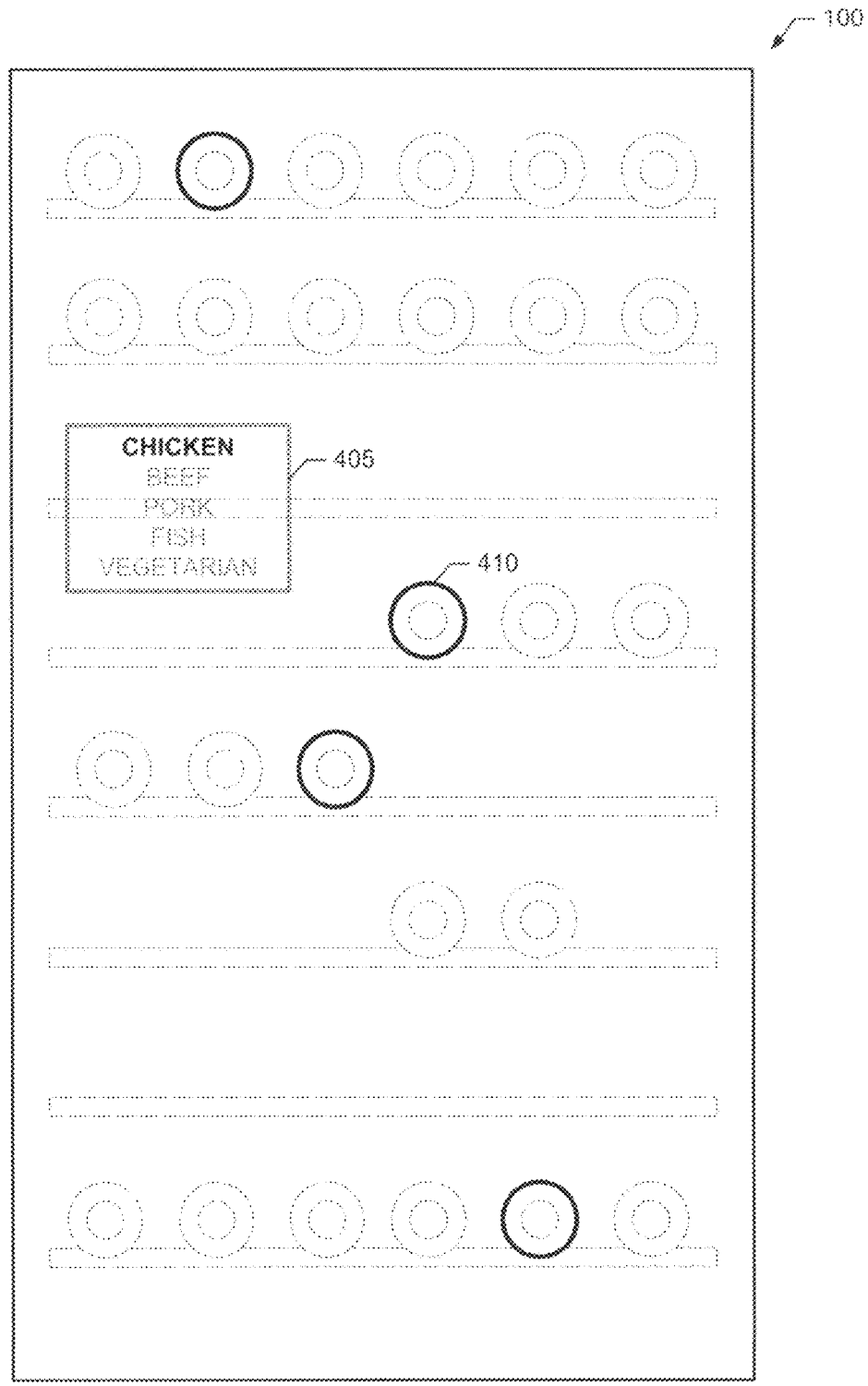

In FIG. 4A, the controller 220 causes the touch display 215 to present a menu 405 that enables the user 106 to select the type of main course to be served (e.g., chicken, beef, pork, fish, vegetarian, etc.). If the user 106 selects "chicken" using the menu 405, the controller 220 causes the touch display 215 to update the menu 405 to indicate that chicken was selected (see, FIG. 4B). As shown in FIG. 4B, the controller 220 causes the touch display 215 to display circles 410 having locations physically corresponding to bottles of wine stored in the wine cabinet 100 suitable for serving with chicken. While circles are used in the examples described herein, indicators having other geometries and/or characteristics may be used. The user 106 can select one of the identified wines by touching on or near the portion of the touch display 215 corresponding to the selected wine.

Figure 4C:
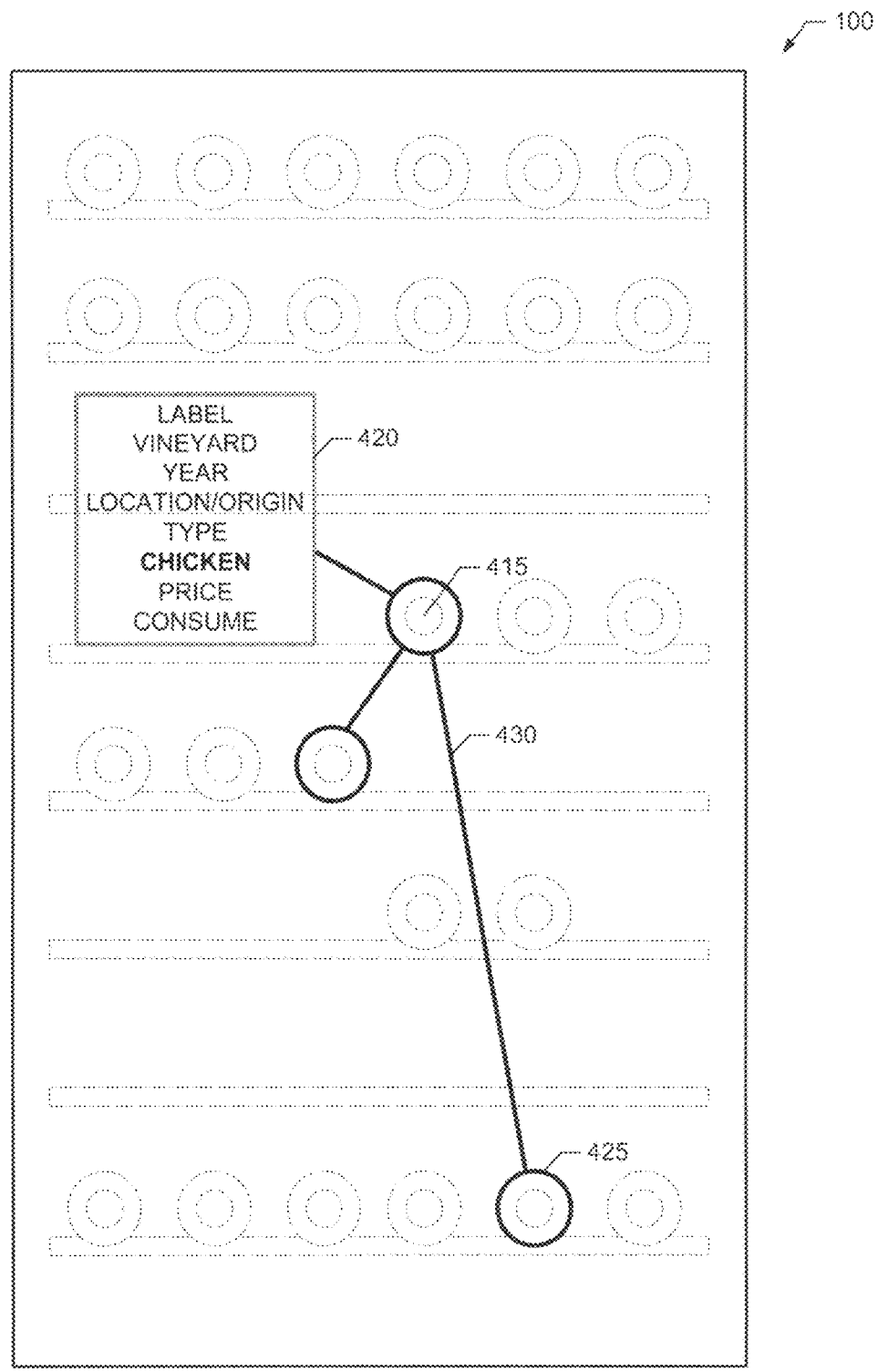

For example, as shown in FIG. 4C, if the user selects a bottle of wine 415, the controller 220 causes the touch display 215 to present information 420 associated with the bottle of wine 415 on the touch display 215. As shown in FIG. 4C, other wines that are similar to the selected bottle of wine 415 may be identified with circles 425 connected to the wine 415 with lines 430. Such similarity information can be used by the user 106 to make an alternative wine selection.

Figure 4D:
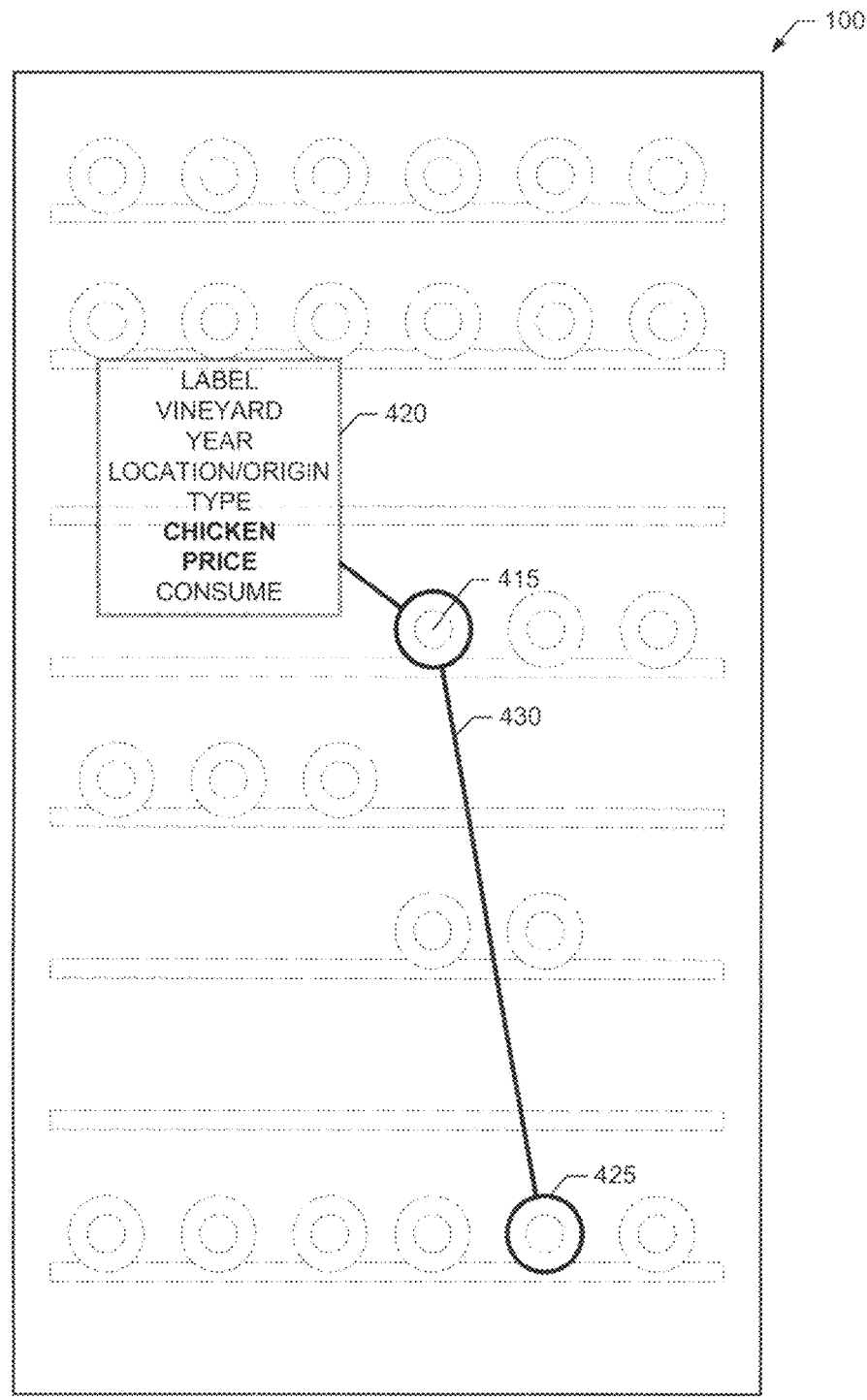

As shown in FIG. 4D, the user 106 may refine the displayed similarity information by selecting for example, "price," which restricts the circles 425 to only include those wines having prices similar to the selected wine 415.

Figure 4E:
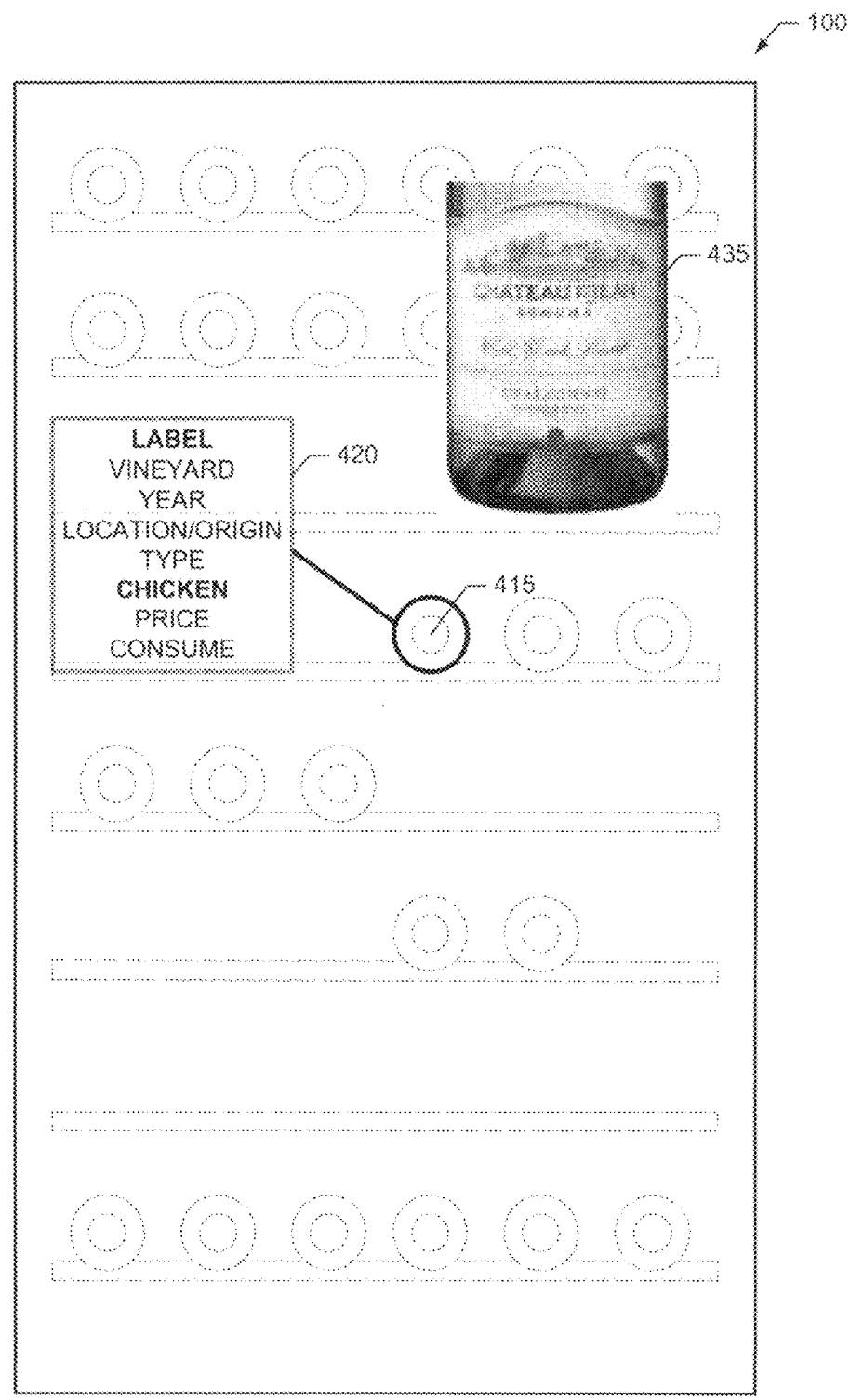

Returning to FIG. 4C, if the user selects "Label" in the information 420, the controller 220 causes the touch display 215 to display an image 435 of the label of the selected bottle 415, as shown in FIG. 4E. In some examples, the user can use a touch gesture to rotate the label 435 to mimic a virtual turning of the bottle of wine 415 without having to disturb or remove the bottle of wine 415 from the wine cabinet 435.

Returning to FIG. 4C, if the user selects "Consume" in the information 420, the controller 220 updates the wine database 225 to reflect that the bottle of wine 415 has or is to be consumed and will no longer be stored in wine cabinet 100.

FIGS. 5A-5E are a pictorial representation of an example usage of the example interactive transparent touch screen door 105 to search for and obtain information associated with a bottle of wine. The example usage of FIGS. 5A-5E may be activated when, for example, the user 106 touches the portion of the example menu 305 of FIG. 3 corresponding to the phrase "Search Wine."

Figure 5A:
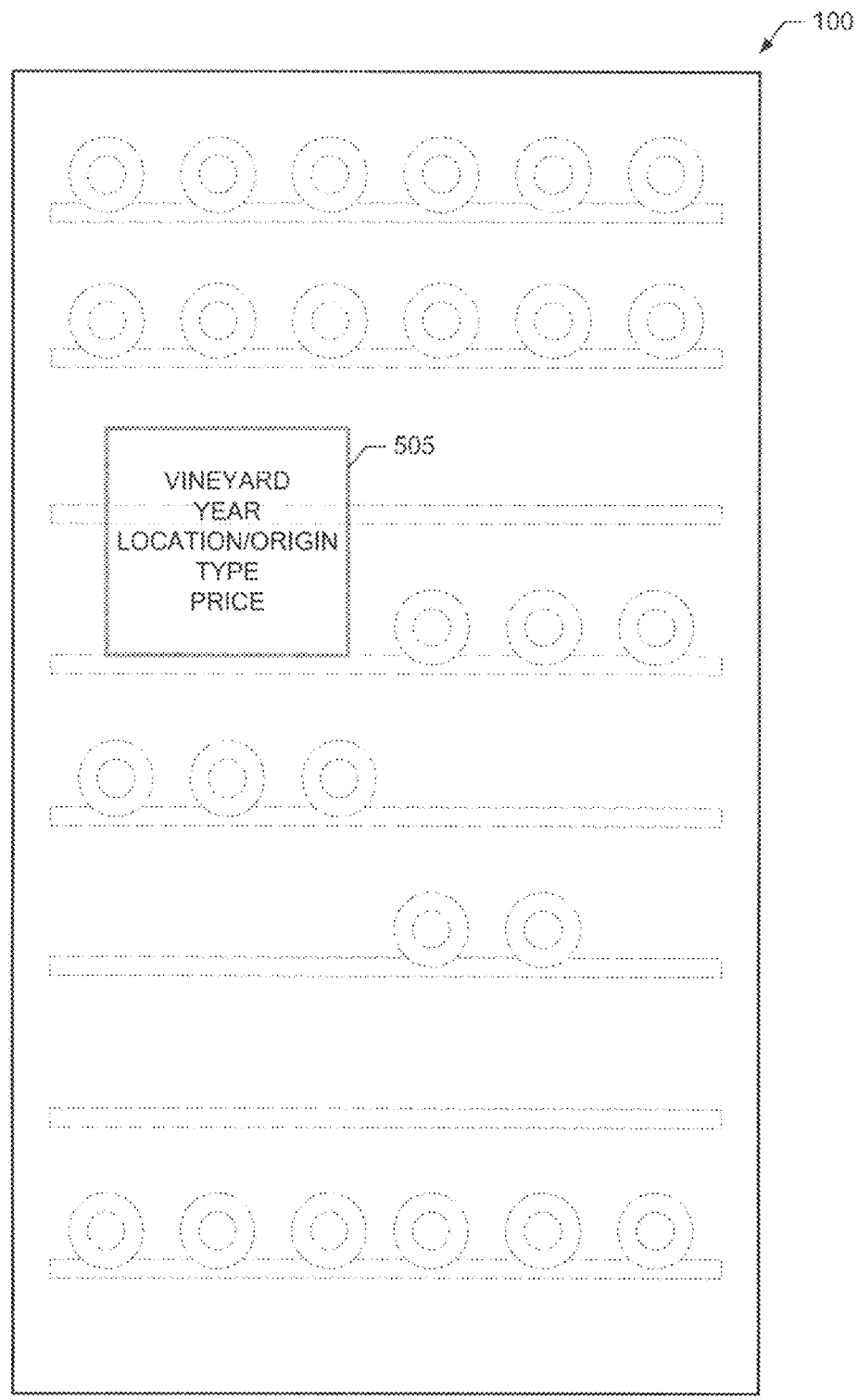
FIGS. 5A-5E are pictorial representations of another example usage of the example interactive transparent touch screen door of FIGS. 1 and 2 to search for and obtain information associated with a bottle of wine.
Figure 5B:
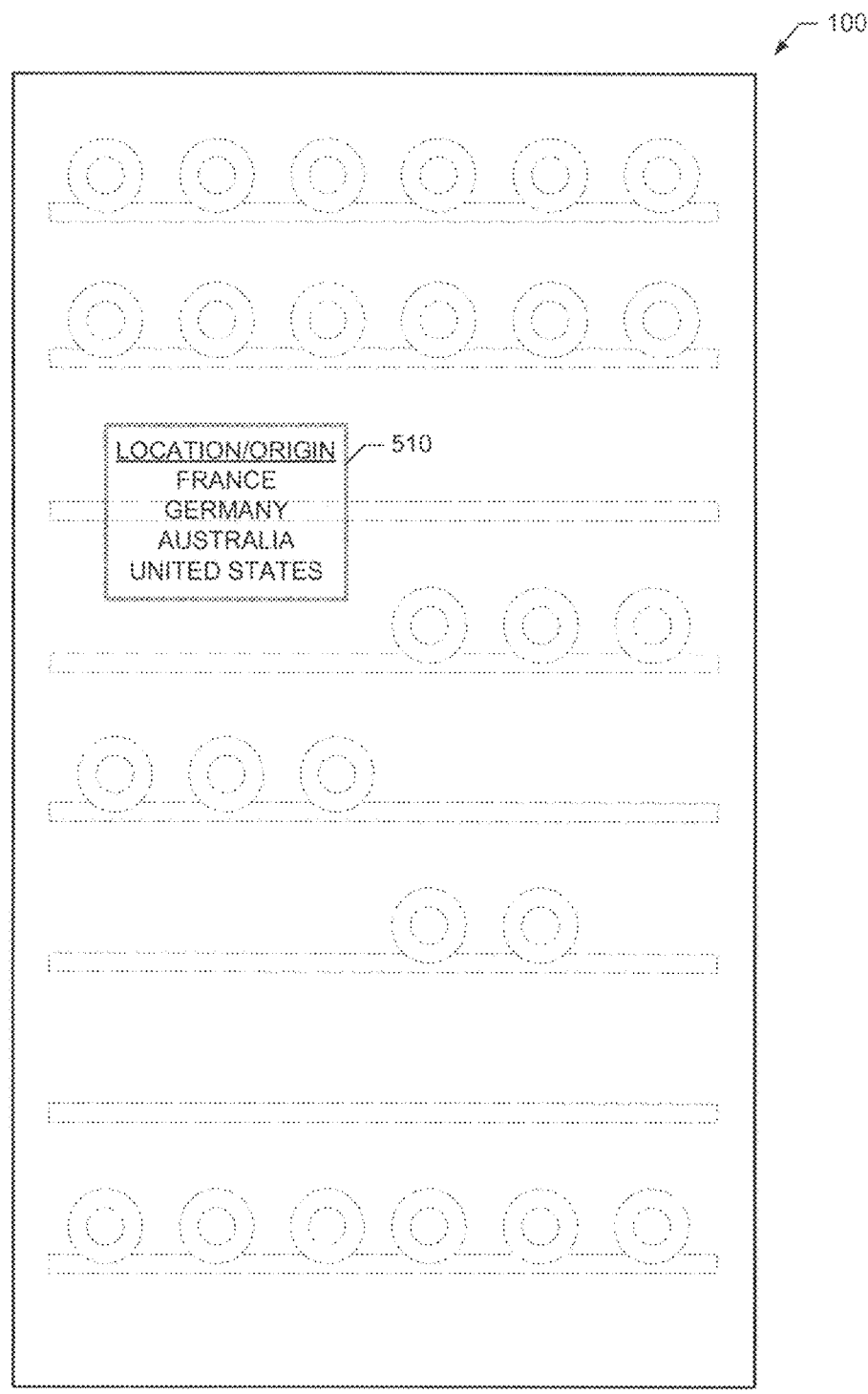
Figure 5C:
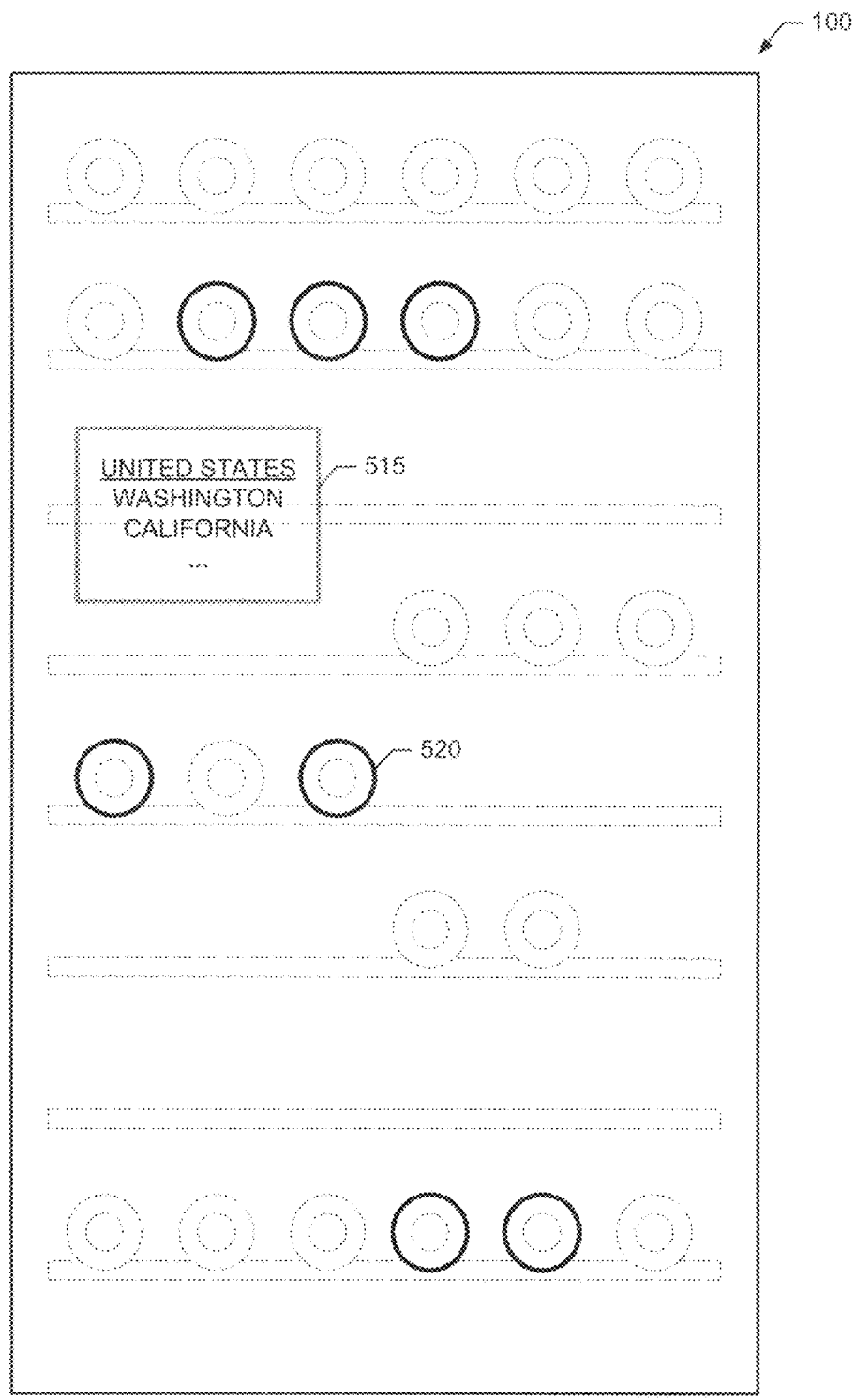

In FIG. 5A, the controller 220 causes the touch display 215 to present a menu 505 that enables the user 106 to select a search criteria. If the user 106 selects "Location/Origin" using the menu 505, the controller 220 causes the touch display 215 to present a menu 510 that enables the user 106 to select a location/origin, as shown in FIG. 5B. If the user 106 selects "United States" in the menu 510, the controller 220 causes the touch display 215 to present a menu 515 that enables the user 106 to select a location within the United States, as shown in FIG. 5C. The controller 220 may also cause the touch display 215 to display circles 520 having locations physically corresponding to bottles of wine stored in the wine cabinet 100 originating in the United States.

Figure 5D:
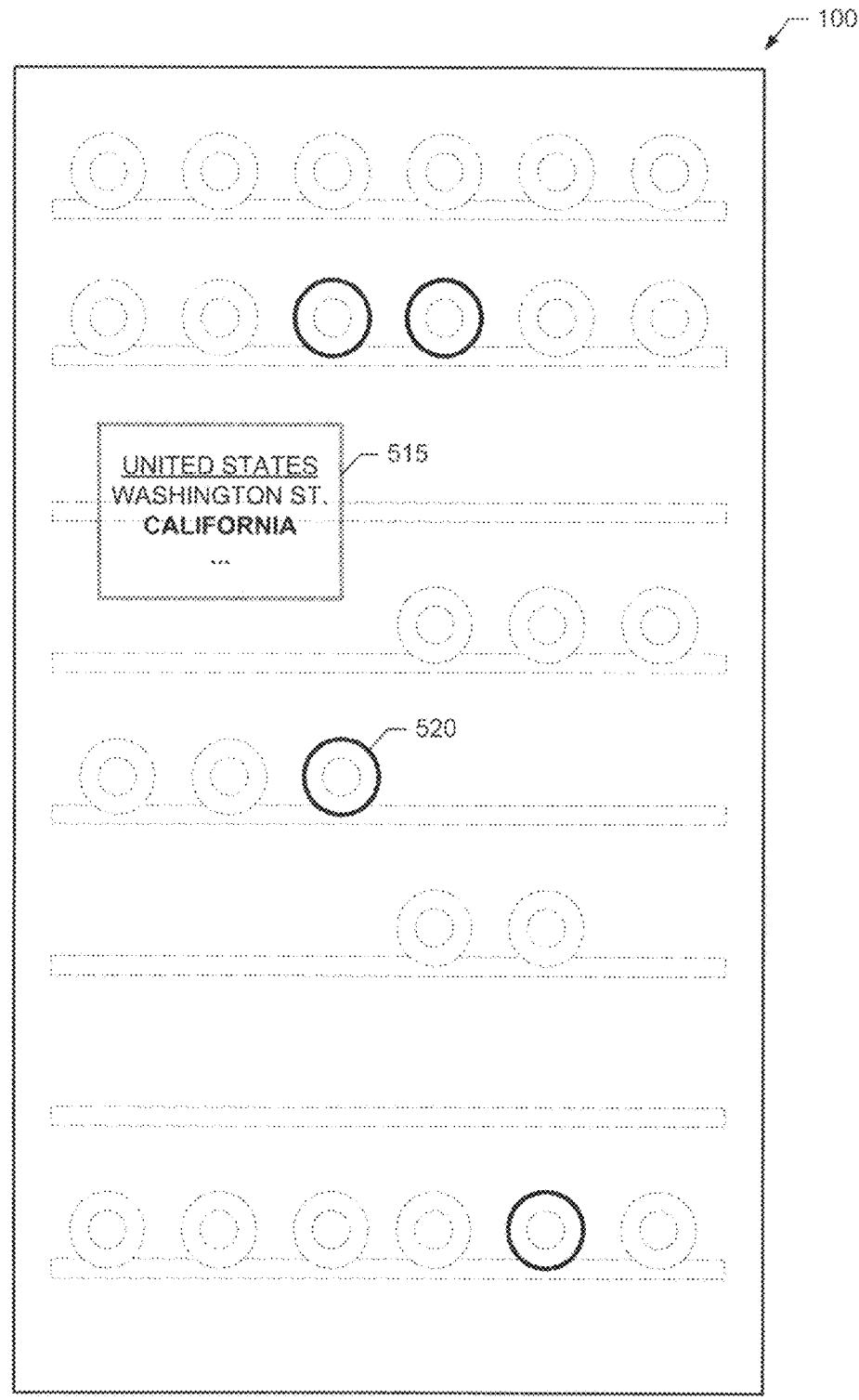

As shown in FIG. 5D, if the user 106 selects "California" in the menu 515, the controller 220 causes the touch display 215 to update the menu 515 to reflect that California has been selected and updates the circles 520 to only indicate wines that originated in California.

Figure 5E:
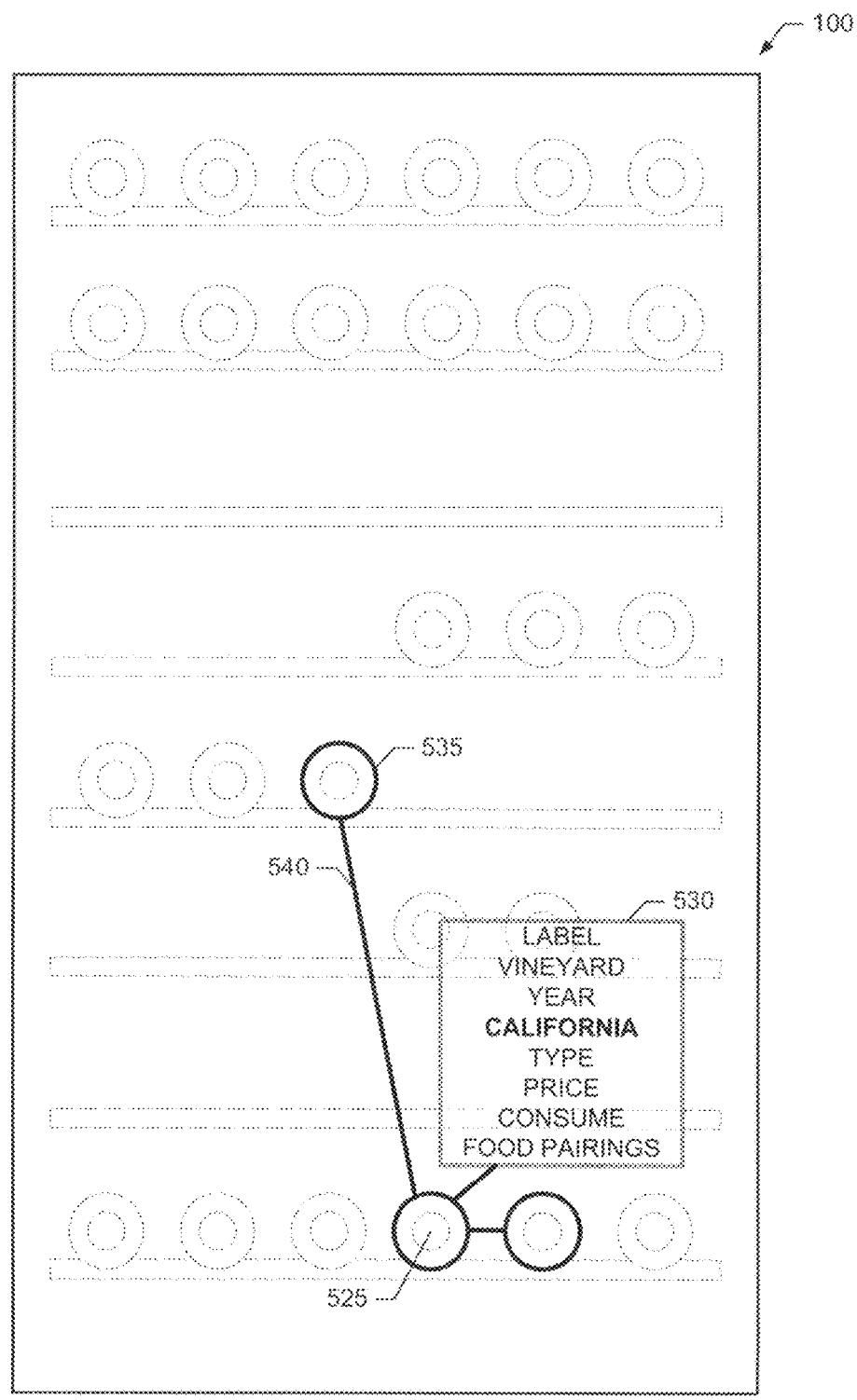

If the user selects a particular bottle of wine 525, as shown in FIG. 5E, the controller 220 causes the touch display 215 to present information 530 associated with the bottle of wine 525 on the touch display 215. As shown in FIG. 5E, other wines that are similar to the selected bottle of wine 525 may be identified with circles 535 connected to the bottle of wine 525 by lines 540. Such similarity information can be used by the user 106 to make an alternative wine selection.

Returning to FIG. 5A, in a similar fashion other search criteria such as year, vineyard, type, price, etc. may be used to search for and obtain information about a bottle of wine.

Figure 6A:
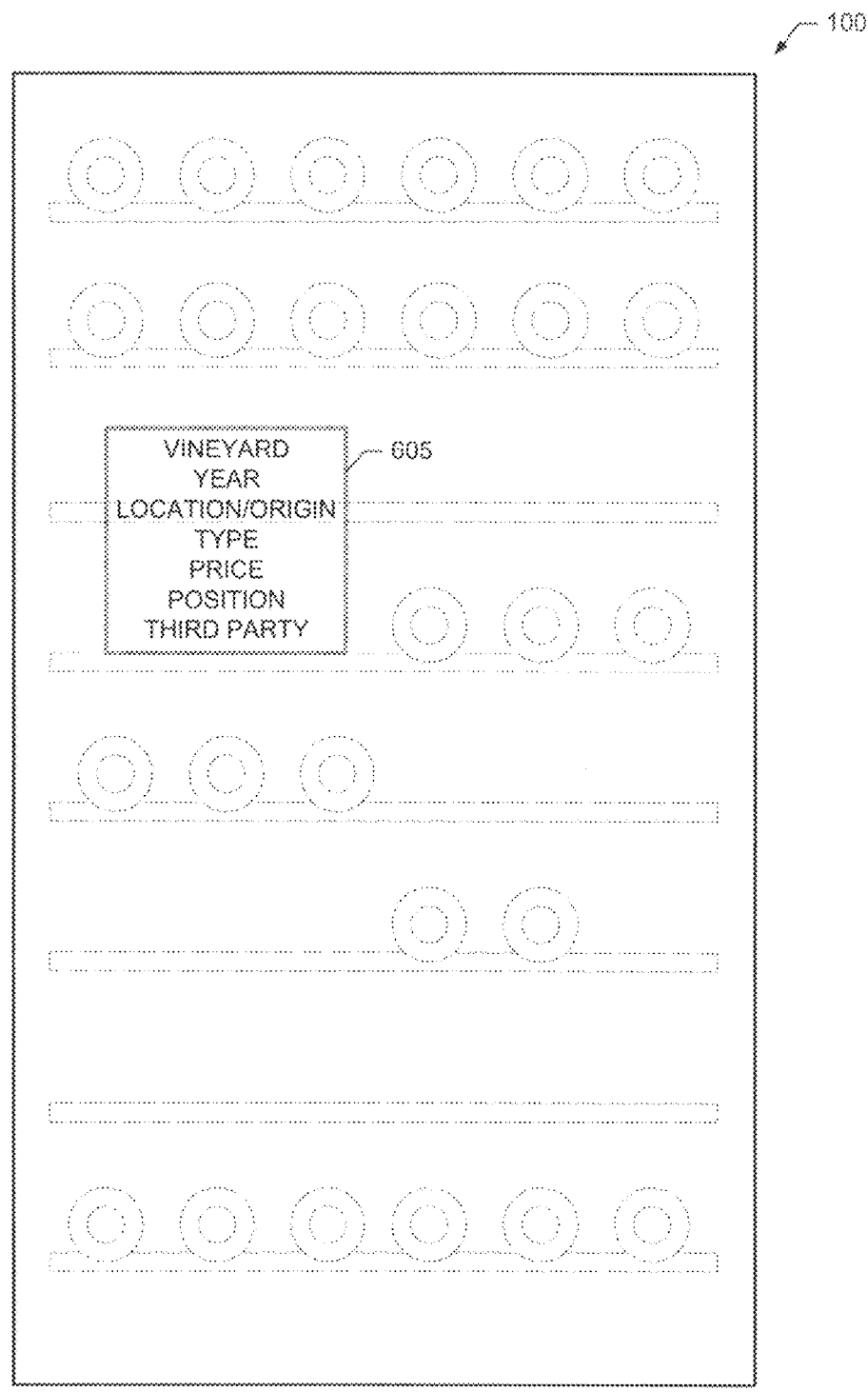
FIGS. 6A-6C are pictorial representations of an example usage of the example interactive transparent touch screen door of FIGS. 1 and 2 to add a bottle of wine to a wine cabinet.
Figure 6B:
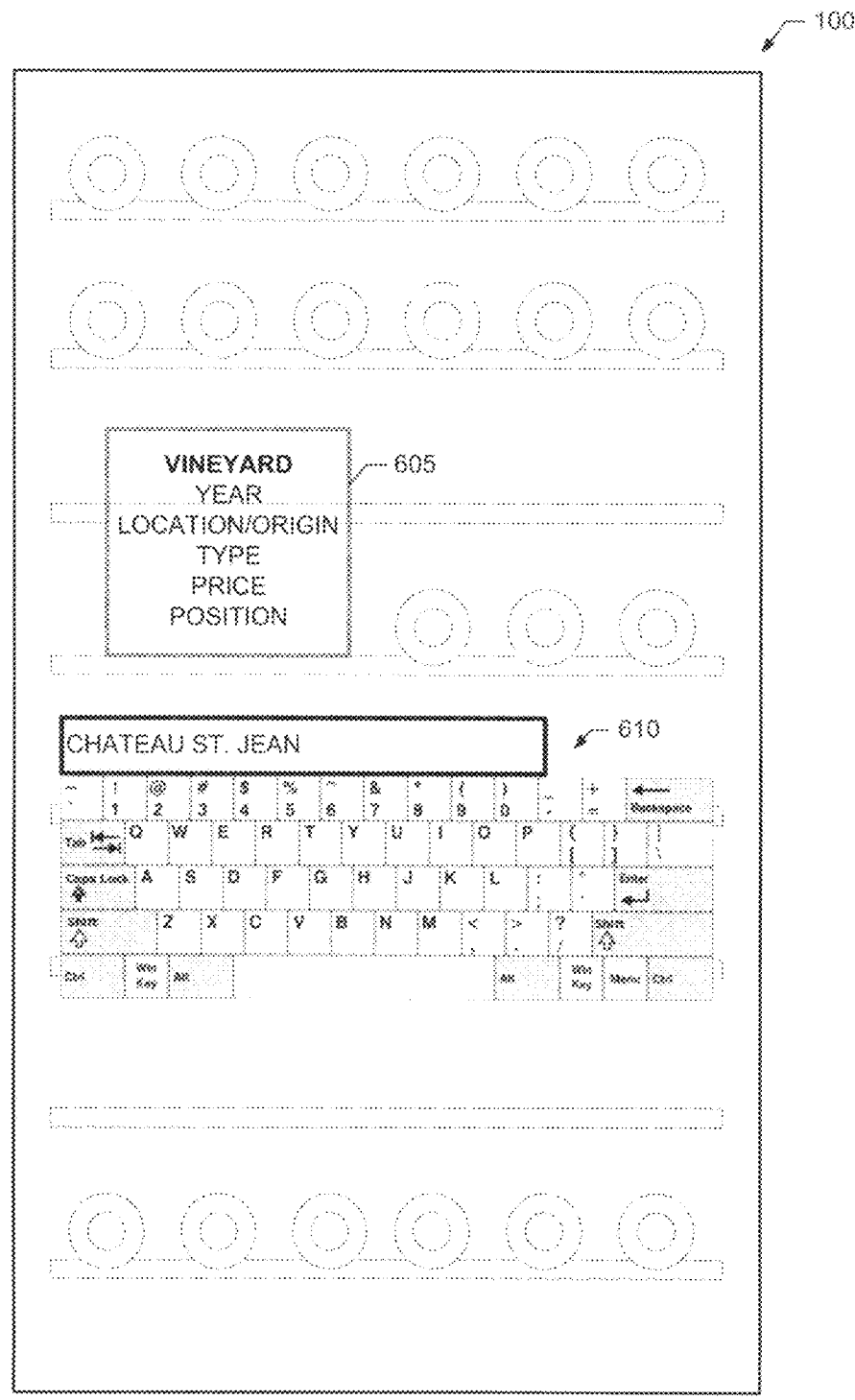
Figure 6C:
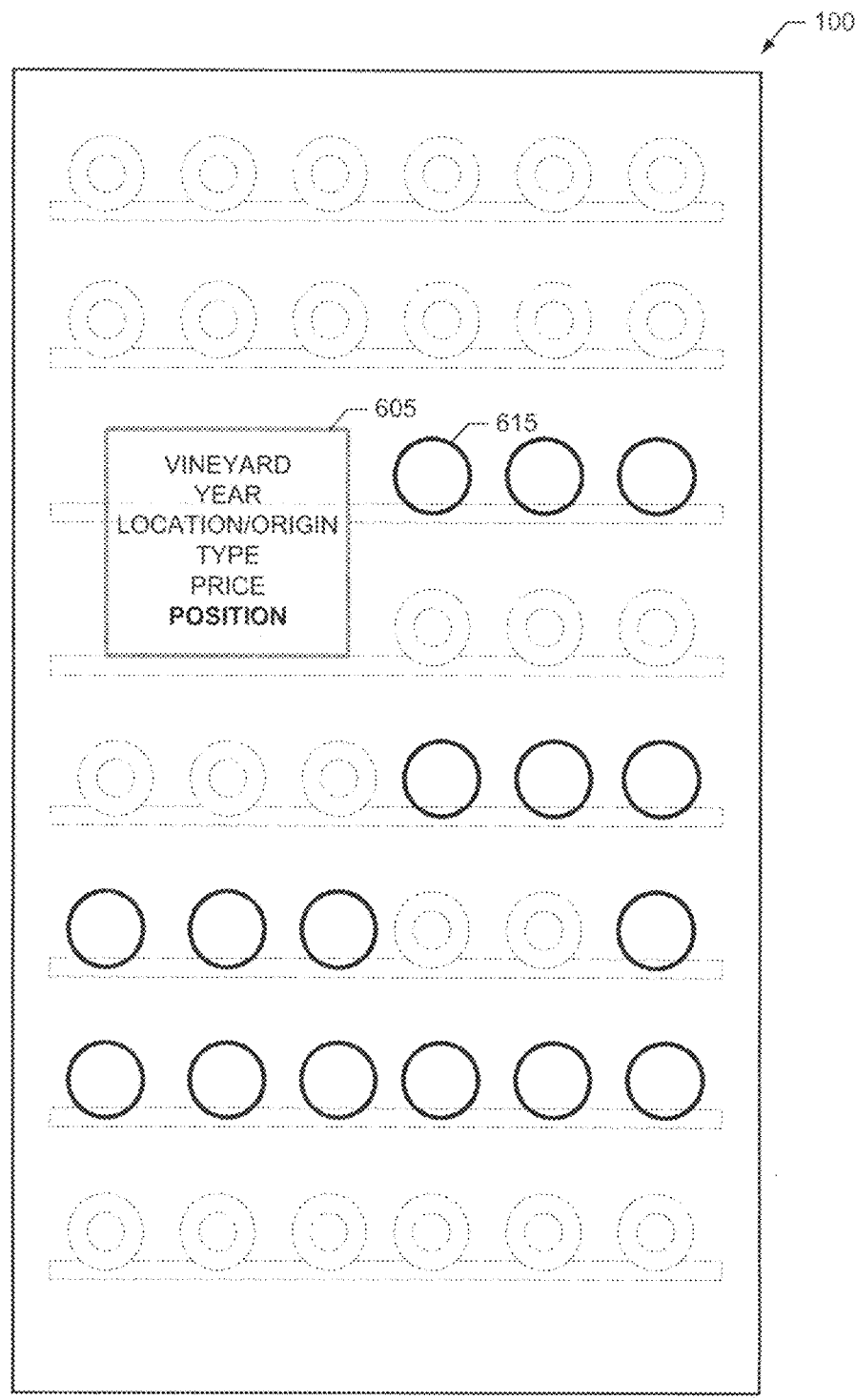

FIGS. 6A-6C are a pictorial representation of an example usage of the example interactive transparent touch screen door 105 to add a bottle of wine to the wine cabinet 100. The example usage of FIGS. 6A-6C may be activated when, for example, the user 106 touches the portion of the example menu 305 of FIG. 3 corresponding to the phrase "Add Wine."

In FIG. 6A, the controller 220 causes the touch display 215 to present a menu 605 that enables the user 106 to enter information associated with a new bottle of wine. The user 106 provides information by selecting one of the menu items presented in the menu 605 and uses one or more subsequent menus to provide the information. For example, as shown in FIG. 6B, if the user 106 selects to provide Vineyard information, a virtual keyboard 610 may appear that allows the user 106 to type in the name of the vineyard associated with the new bottle of wine. In some examples, the menu 605 includes an interface to third party wine databases to obtain information associated with the new bottle of wine.

To indicate a storage location in the wine cabinet 105 for the new bottle of wine, the user 106 selects the "position" item in the menu 605 of FIG. 6A. As shown in FIG. 6C, the controller 220 causes the touch display 215 to display circles 615 at each location of the wine cabinet not currently storing a bottle of wine. The user 106 may select the location for the new bottle of wine by touching in, on or near the corresponding circle 615.

Figure 7:
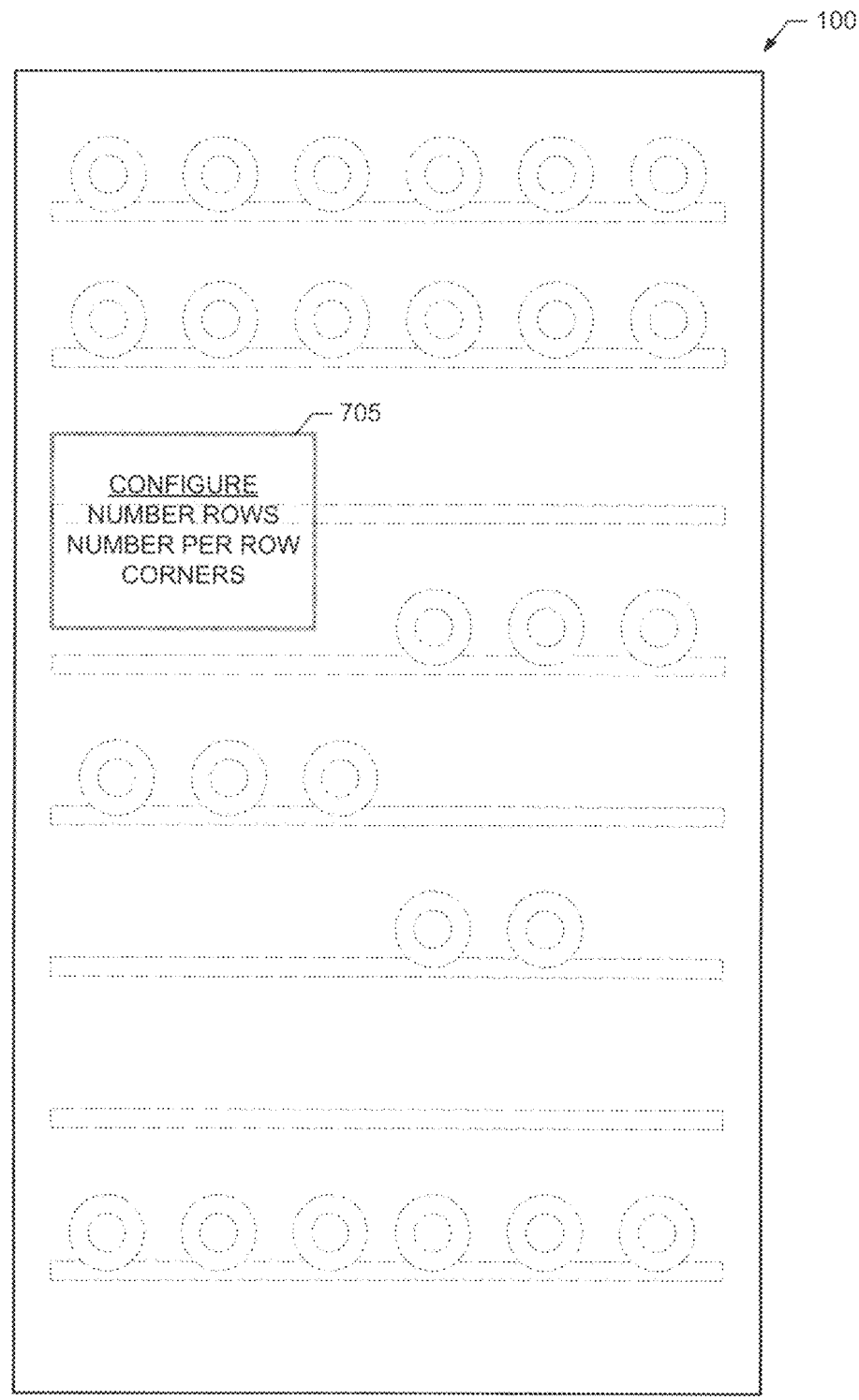
FIG. 7 is a pictorial representation of an example usage of the example interactive transparent touch screen door of FIGS. 1 and 2 to configure the interactive transparent touch screen door for use with a wine cabinet.

In some examples, the controller 220, the communication interface 230 and the wine database 225 are embedded in the door 105 to enable the door to be configurable for use with different wine cabinets. In such examples, the menu 305 of FIG. 3 may include an option that allows the user 106 to configure the possible locations of wine bottles in the wine cabinet 100. As shown in FIG. 7, the controller 220 may cause the touch display 215 to present a menu 705 that allows the user to identify the extent of the area used to store bottles of wine, the number of rows of wine, the number of bottles per row, etc.

Figure 8:
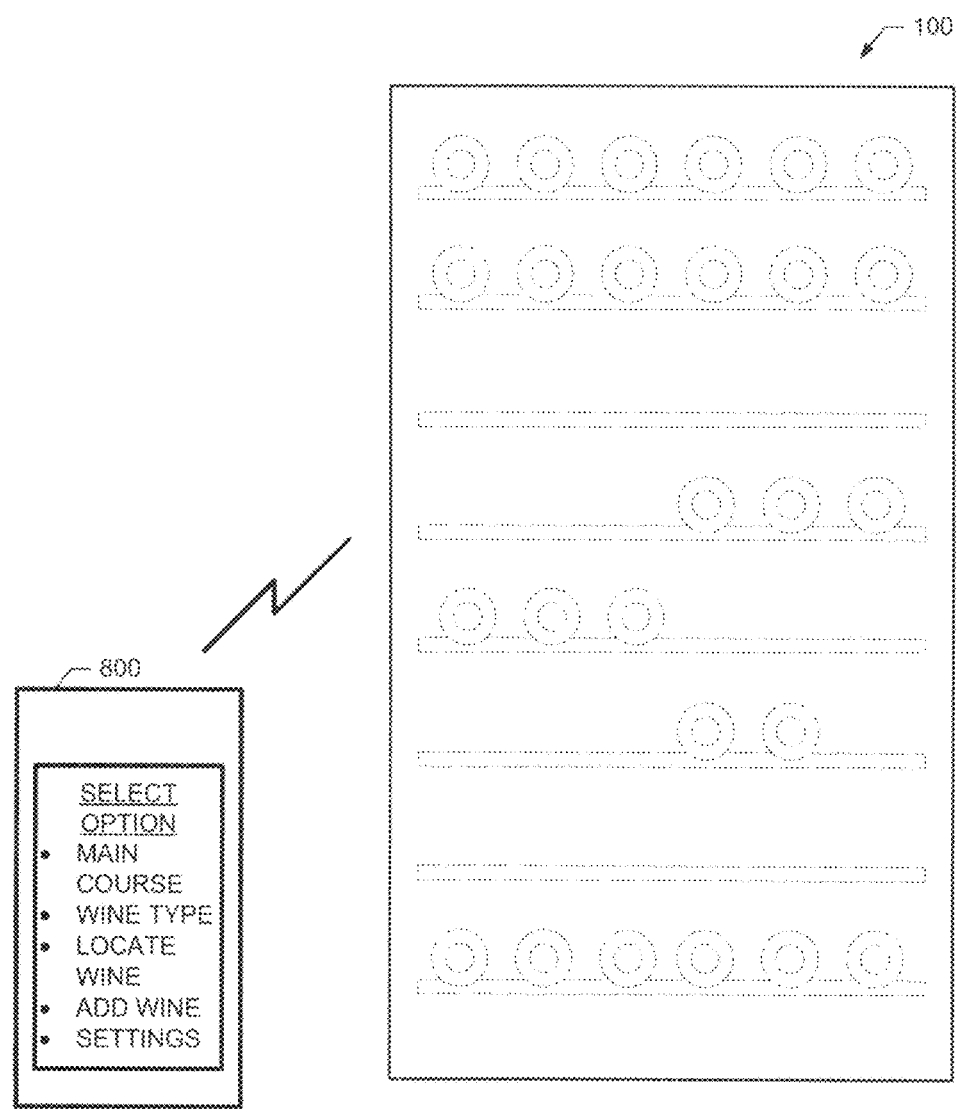
FIGS. 8, 9 and 10 are pictorial representations of an example usage of a handheld computing device to interact with the example interactive transparent touch screen door of FIGS. 1 and 2.
Figure 9:
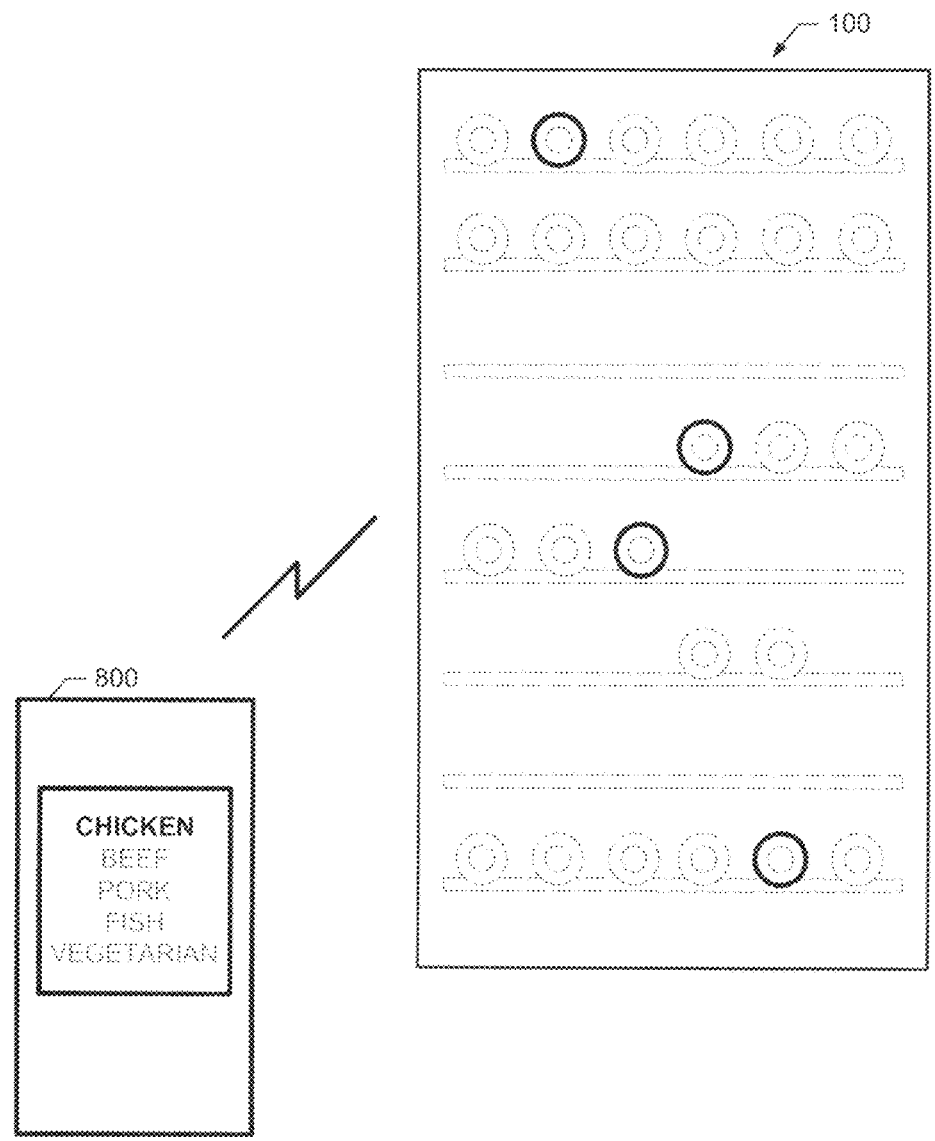
Figure 10:
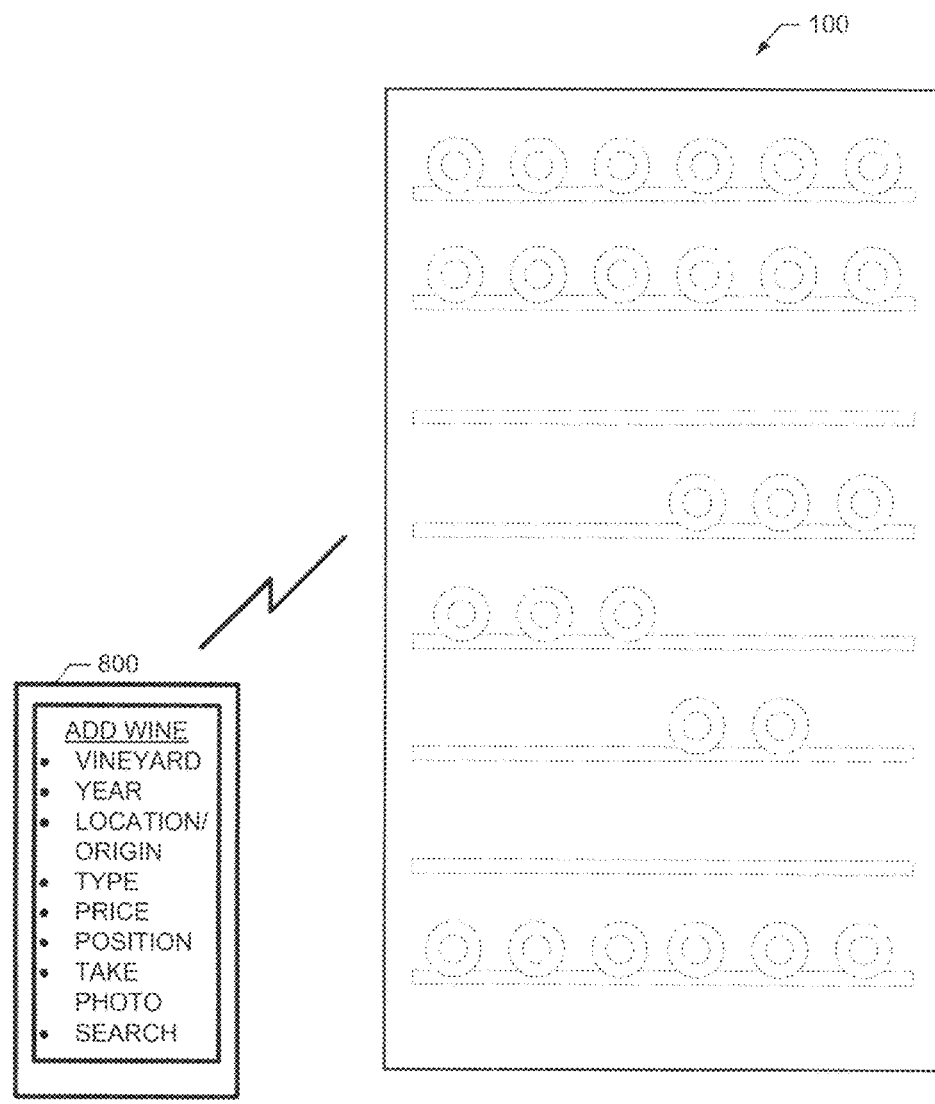

As shown in FIGS. 8-10, a handheld computing device 800 such as a smartphone, a tablet computer, etc. can be communicatively coupled to the wine cabinet 100 such that the user may interact with menus on the handheld computing device 800 rather than on the touch display 215. However, in such examples, indications regarding the physical locations of wines meeting search criteria may still be displayed on the touch display 215 (see FIG. 9), and information associated with a wine may still be displayed on the touch display 215. In addition to implementing menus, the handheld device 800 may be used to capture one or more images of a new bottle of wine before the bottle of wine is stored in the wine cabinet 100 (see FIG. 10) and/or may store the wine database 225. In some examples, the handheld computing device 800 may perform image processing and/or image recognition on an image of a bottle label to automatically identify a bottle of wine and to obtain information regarding a bottle of wine from a third party wine database. Moreover, the handheld computing device 800 may scan and use information stored in a one, two or three-dimensional universal product code (UPC) label printed on the bottle of wine to identify and/or obtain information regarding the bottle of wine.

Figure 11:
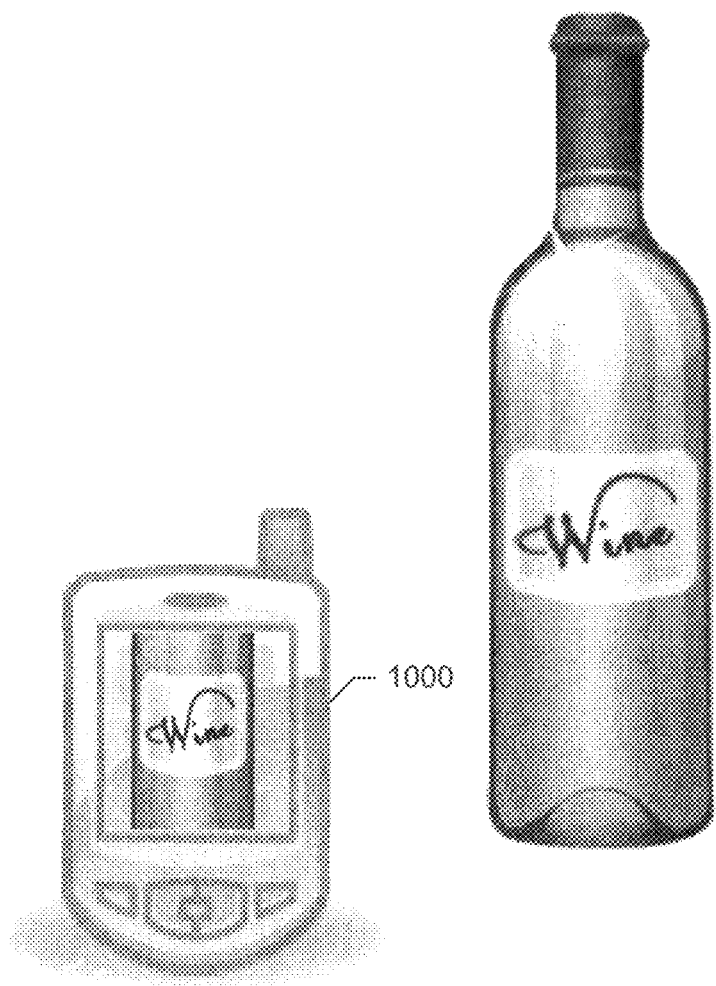
FIG. 11 is a pictorial representation of imaging a portion of a wine bottle with an imaging device.

Additionally, as shown in FIG. 11, another embodiment of invention is utilizing an imaging device 1000 to image a bottle. Imaging device 1000 could be a tablet, smart phone, smart glasses, or other imaging/storage device including cameras installed in the wine cabinet or its door.

Figure 12:
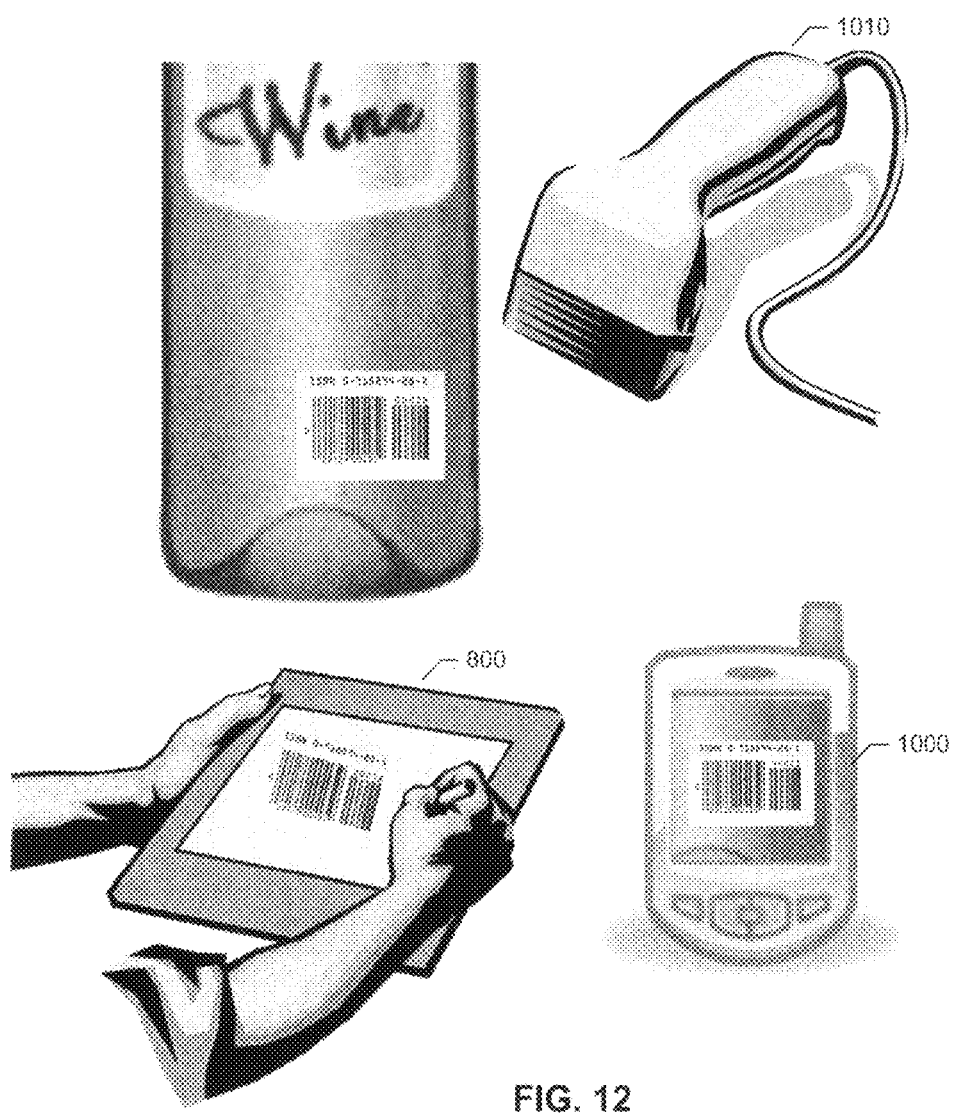
FIG. 12 is a pictorial representation of various scanning devices for scanning a wine bottle

As shown in FIG. 12 and as discussed above, a handheld computing device 800 or other scanning device 1010 (such as an RFID or a UPC reader) can be used to scan and use information stored in a one, two or three-dimensional universal product code (UPC) label printed on the bottle of wine to identify and/or obtain information regarding the bottle of wine or associated with the bottle of wine (e.g. a RFID tag. a scan code, an image or the like). Alternatively scanning device 1010 could a scan a label, foil, cork, stopper or similar location on the wine and identify characters, words and/or images. In addition, or in combination with the scanning device 1010, user input could identify the wine. It should be further understood that handheld computing device 800, imaging device 1000, and scanning device 1010, could be three separate devices, two devices or a single device.

Figure 13:
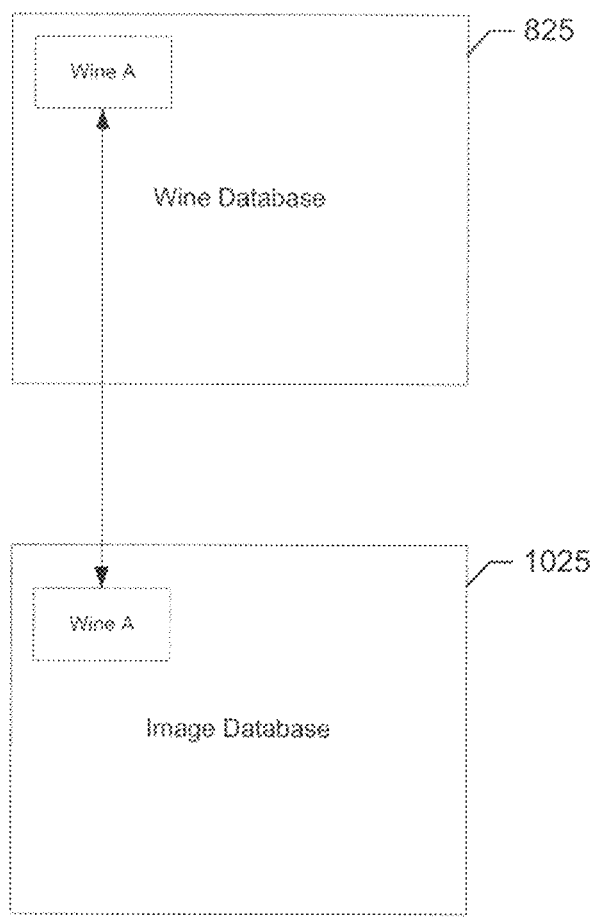
FIG. 13 is a pictorial representation of a wine database and an image database and potential linking or relating of related records.

As shown in FIG. 13, once the wine is identified from wine database 825, an aspect of the invention is to attempt to provide identification of one or more images or representations associated with the wine identified in or from wine database. These images or representations may be in a image database 1025, which may be pre-populated or loaded with images and/or representations. These could be images, line drawings or the like of the entire bottle or an image, line drawings or the like of one or more labels for the wine.

Figure 14A:
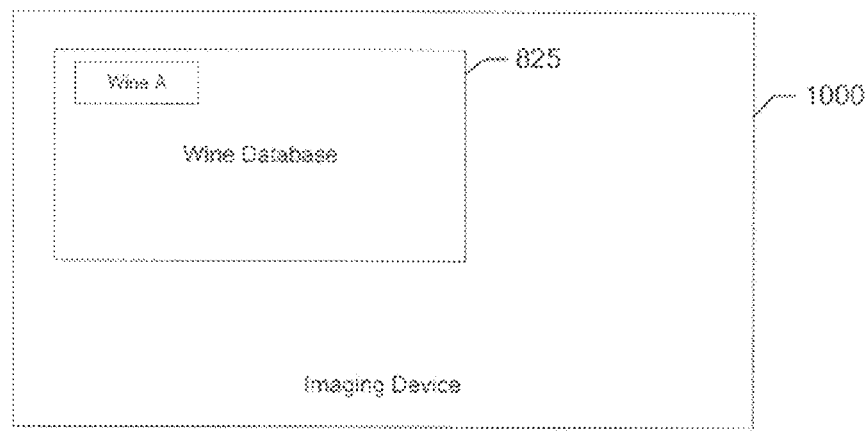
FIG. 14*a* is a pictorial representation of a wine database on an imaging device.
Figure 14B:
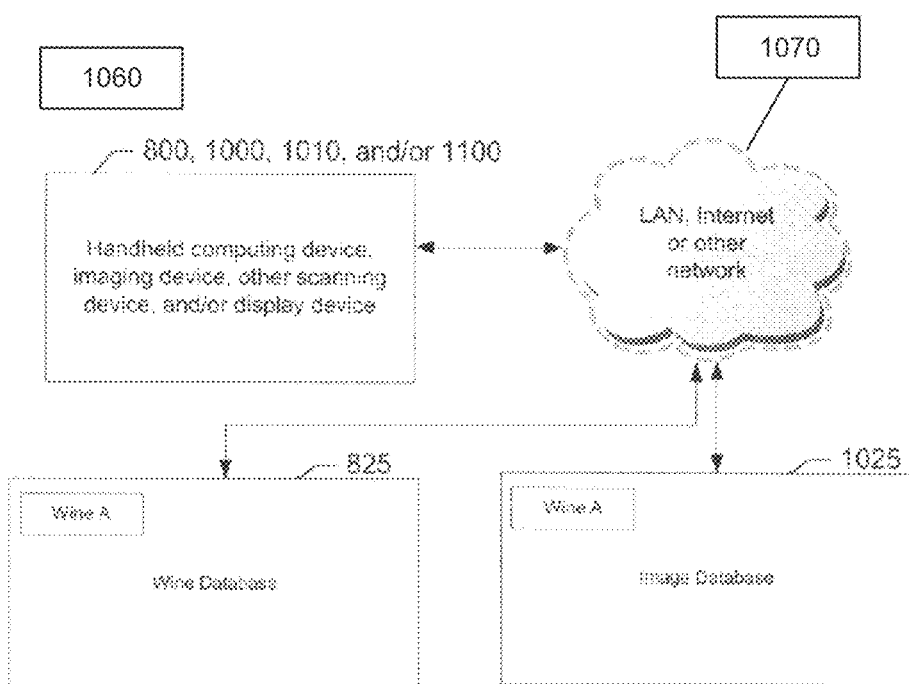
FIG. 14*b* is a pictorial representation of a wine database remote to an imaging device, scanning device or handheld computer.

As shown in FIG. 14a, preloaded image database 1025 may be resident on imaging device 1000 or, as shown in FIG. 14b, or remote from imaging device 1000. Similarly the wine database 825 may also be remote from the imaging device 1000. For clarity, as shown in FIG. 14b, one or more of the databases (or portion thereof) may be remote from one or more of the listed devices.

Conversely, one or more of the databases or portion thereof) may be resident from one or more of the listed devices in FIG. 14b (although the residency of the databases are not shown). If image database 1025 is not resident on the imaging device 1000 it may be on an associated device 1060 (such as a memory stick or computing device) or on a network device 1070 (such as a database device on a local area network (LAN) or one on connectable via the web or similar structure). Similarly, wine database 825 may be resident on imaging device 1000, other scanning device 1010 or hand held computer 825 or remote from such devices (not shown).

Figure 15:
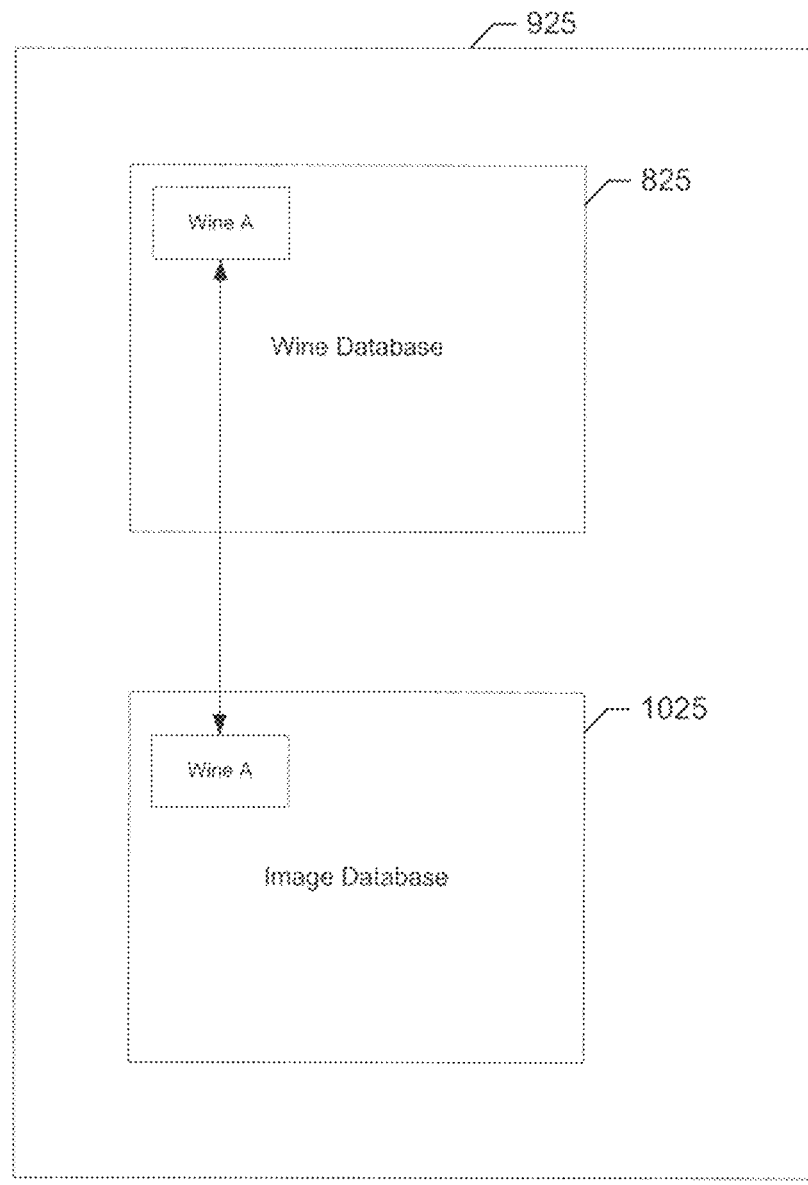
FIG. 15 is a pictorial representation of a wine database and an image database in a single database and a potential linking or relating of related records.
Figure 16A:
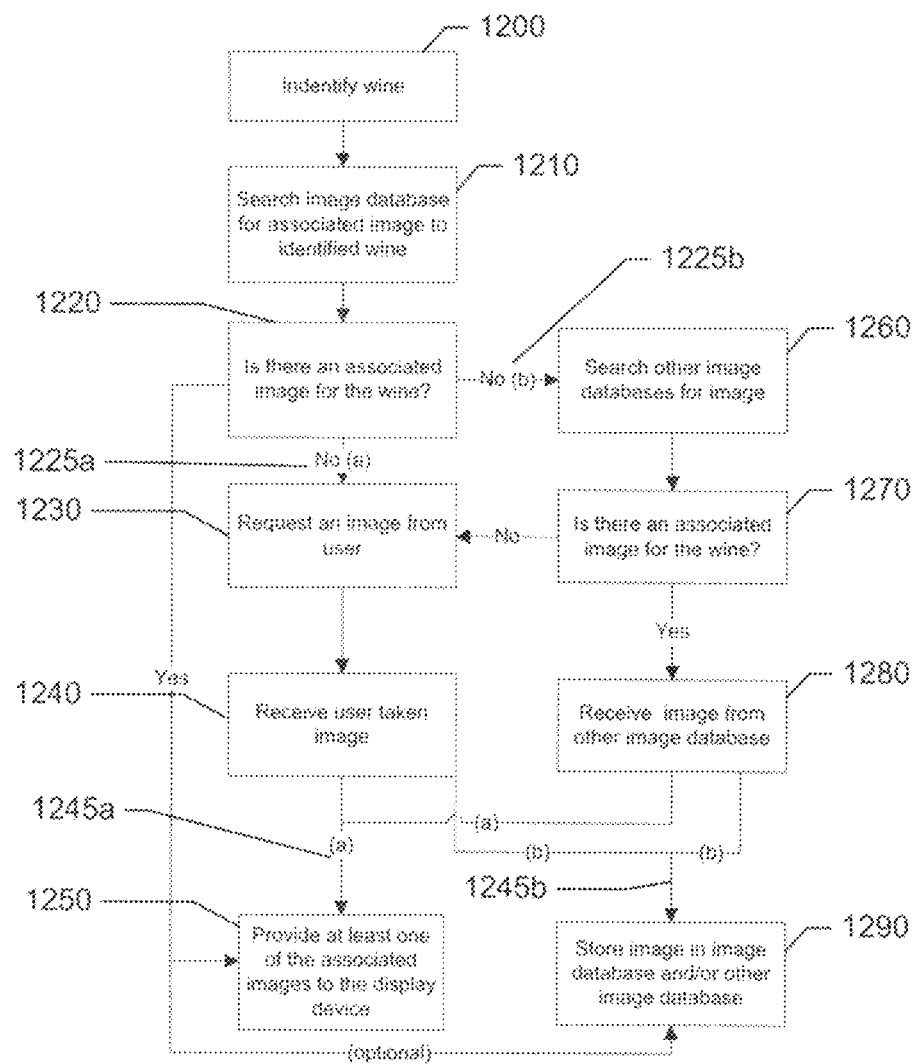
FIG. 16*a* is a flow chart representation of an embodiment of the system for acquiring information of a wine bottle and displaying and/or storing a related image.

As shown in FIG. 15, image database 1025 may be integrated with wine database 225 into a single combined database 925 or, as shown in FIG. 13, image database 1025 may be separate from wine database 225. In either circumstance, where it is desired to use both wine database and image database 1025, a database record for a wine in database 225 should be linked or connected to the representative image in image database 1025. It should be appreciated that the images could remain as images on the system, or be converted, either at time of storage, through a pre or post processing step, or at time of display into a representation of the image, such as a line drawing or other representation. For clarity, when discussing "image" the reader should understand that it may be a "picture", a line drawing, or other representation capable of being displayed on display device 1100. This display device 1100 could be the hand held computing device 800 discussed above, or touch display 215, or any other device capable of displaying the desired representation In one embodiment, the system, as shown in FIG. 16*a*, may include first identifying the wine (step 1200) and then searching the image database for the associated wine (step 1210). If in step 1220 there is an associated wine, then the system would provide at least one of the associated images to the display device (step 1250). It may be preferable to provide multiple images in step 1250, especially if the images are of different aspect (e.g. front label, rear label, cork, wrapper, and the like). Optionally, step 1290 may be performed and provide the image to another image database (e.g. a remote database via the internet). Step 1290 could alternatively be preformed periodically, either through a user input, a request from the remote image database or at time intervals. If in step 1220, there is not an associated wine image, then either answer 1225*a* or answer 1225*b* can drive step 1230 or step 1260 respectively. Additionally, it may be preferable to perform both steps 1230 and 1260.

In step 1230, the user is requested to take an image, the system then receives the take image in step 1240. Option 1245*a* may be taken and step 1250 can then be performed. Alternative, option 1245*b* may be taken and step 1290 can then be performed. Additionally, it may be preferable to perform both steps 1250 and 1290. It should be appreciated that this would allow a plurality of such imaging devices 1000 (or multiple users of the system) to build a more comprehensive listing of bottle images than any one wine connoisseur could possibly record, regardless of the amount of wine they acquired when such users and/or devices share such information.

In step 1260, an alternative image database (e.g. one on the LAN network or accessible via the internet). If in step 1270 an image is not found then step 1230 is performed as discussed above. If an image is found in step 1270 then the image is received from the other image database (step 1280 and as discussed above step 1250 and/or 1290 are performed. In the case of step 1290, the image is stored in the local database.

Figure 16B:
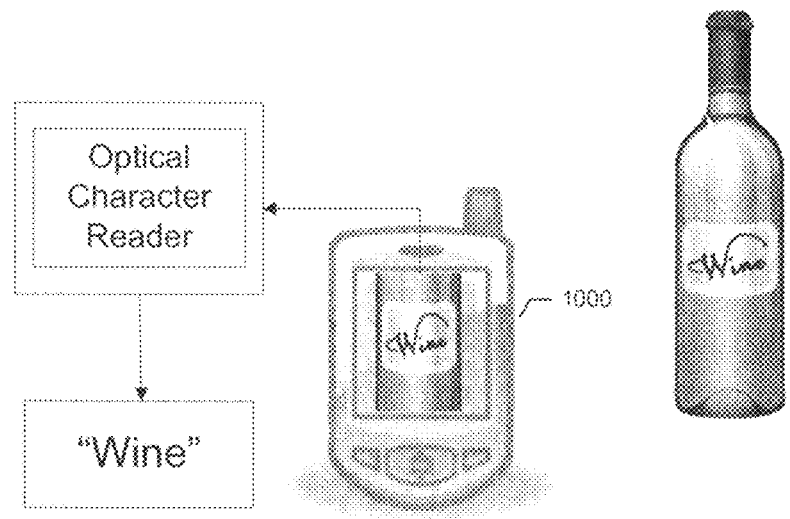
FIG. 16*b* is a pictorial representation of an embodiment using an image to recognize a wine bottle.
Figure 16C:
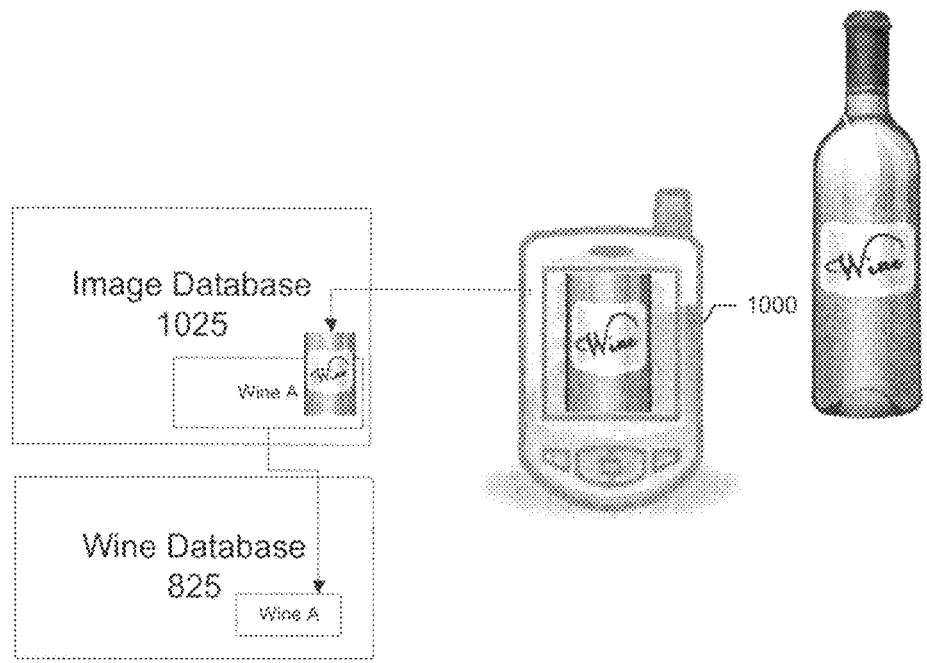
FIG. 16*c* is a pictorial representation of another embodiment using an image to recognize a wine bottle.

As shown in FIG. 16*b*, and discussed prior, the image taken by imaging device 1000 could scan the image for information to make at least make an attempt to predict or guess which wine from wine database 825 has been imaged. This can be done through optical character reading ("OCR"). As shown in FIG. 16*c*, another alternative (or potentially in combination with the information extraction method above) image "matching" could be done to attempt to "match" an image in the image database 1025, and where available, also match the wine information in wine database 825.

Turning back to the imaging of the wine, the image of the wine is preferably taken 360 degrees about the bottle. Another potential option in this invention is to take and/or provide an image of both the side of the bottle as well as the cork from the top, or even adding an image of the bottom of the bottle if desired. These images could be linked, or otherwise combined, in image database 1025. These images could be then displayed as a complete bottle rendering.

Figure 17:
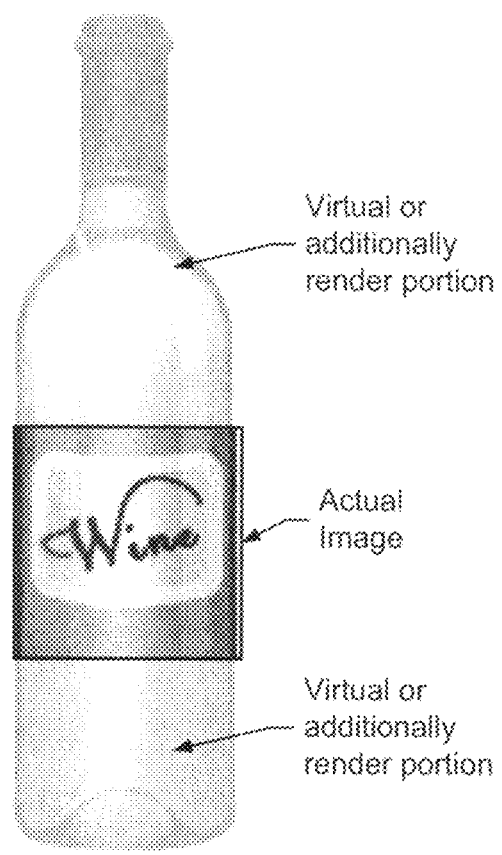
FIG. 17 is a pictorial representation of combining a stored image with a virtual representation to display a bottle.

As shown in FIG. 17, if the image is less than 360 degrees about the bottle, the application storing or displaying this information would preferably recognize the missing aspects (e.g. a portion of the bottle without a label may not have been imaged) and the missing aspects are appropriately filled in. For example, the image database device 1030 (e.g. the device that is maintaining the image database 1025), could create the filled in portion at storage of the image, during a maintenance or other cycle of the database, or at a retrieval request by the display device 1100. If at a retrieval request, the "filled in" image could be then stored as part of the prior image or associated with the prior image, temporarily stored in a database device's cache, or simply recreated upon subsequent requests. Alternatively, display device 1100 can create the "filled in" portion and then store the image as part of the prior image or associated with the prior image on the image database, temporarily store in a image device's cache, or simply recreate the image upon subsequent renderings.

Figure 18:
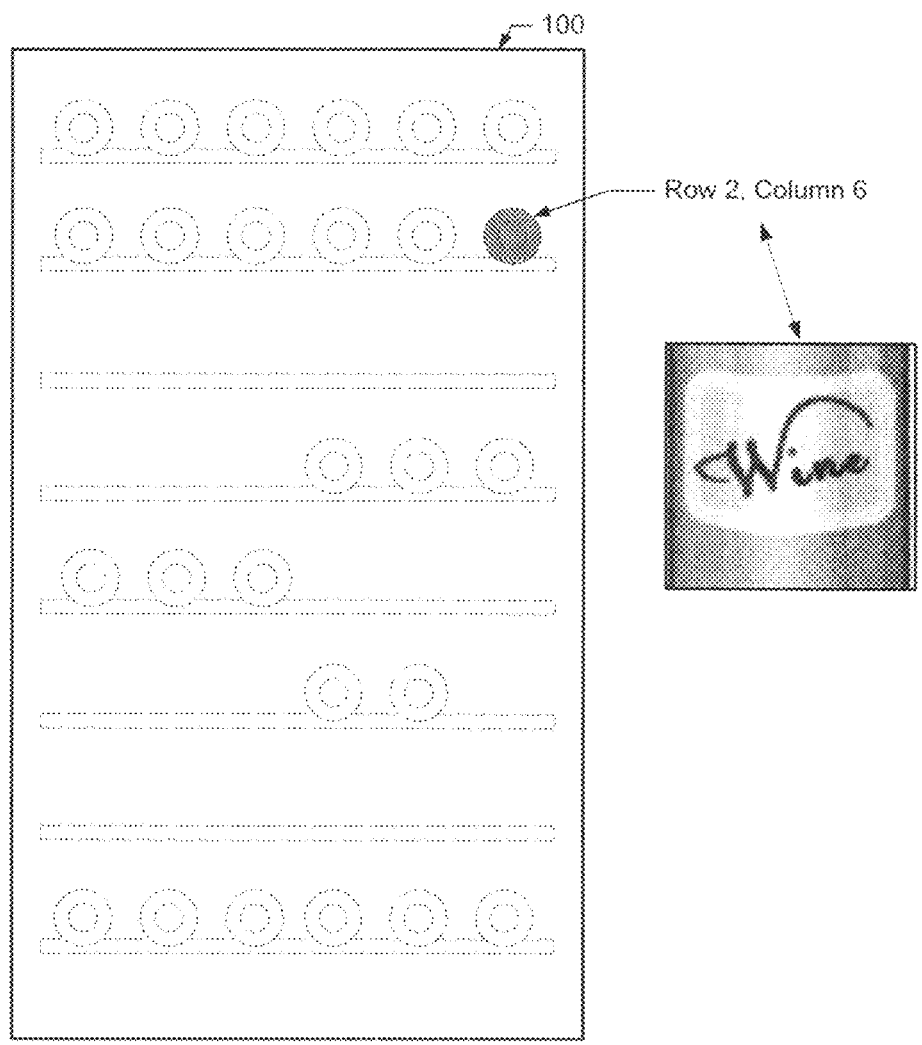
FIG. 18 is a pictorial representation of an embodiment of linking an image to a location for a wine bottle.

This will allow display device 1100 to display to the user a simulated 3D image of a portion of the bottle, or even the whole bottle, to be created and displayed to a user of the system. Alternatively, the display device 1100 could recognize the "gap" or missing portion and then "fill-in" the missing portion of the bottle when viewed by the image display device. The user than could manipulate the image of the bottle on display device 1100 so it could "rotate". The ability to "rotate" allows a user to virtually touch and inspect a bottle without disturbing the actual bottle. It should be understood that in place of an image a text or audible description could be share if no image is available or if that is preferred by the user over viewing an image (e.g. in the case of a hearing challenged user of when quiet is preferred by the user). As shown in FIG. 18, this image will then be preferably linked to a location in the wine cabinet 100 to ease of the location of the wine, either directly in image database 1025 or via a related entry to the image in wine database 825. In this manner the controller 225 could be either resident on the wine cabinet 100 or on a hand held device 800. If a controller exists on both a wine cabinet 100 or a handheld device 800, it may be preferable to link both controllers or at least their associate databases. It may also be preferable for controller 225 to first display a representation of the wine cabinet 100 and where bottles are currently recorded to exist.

Figure 19:
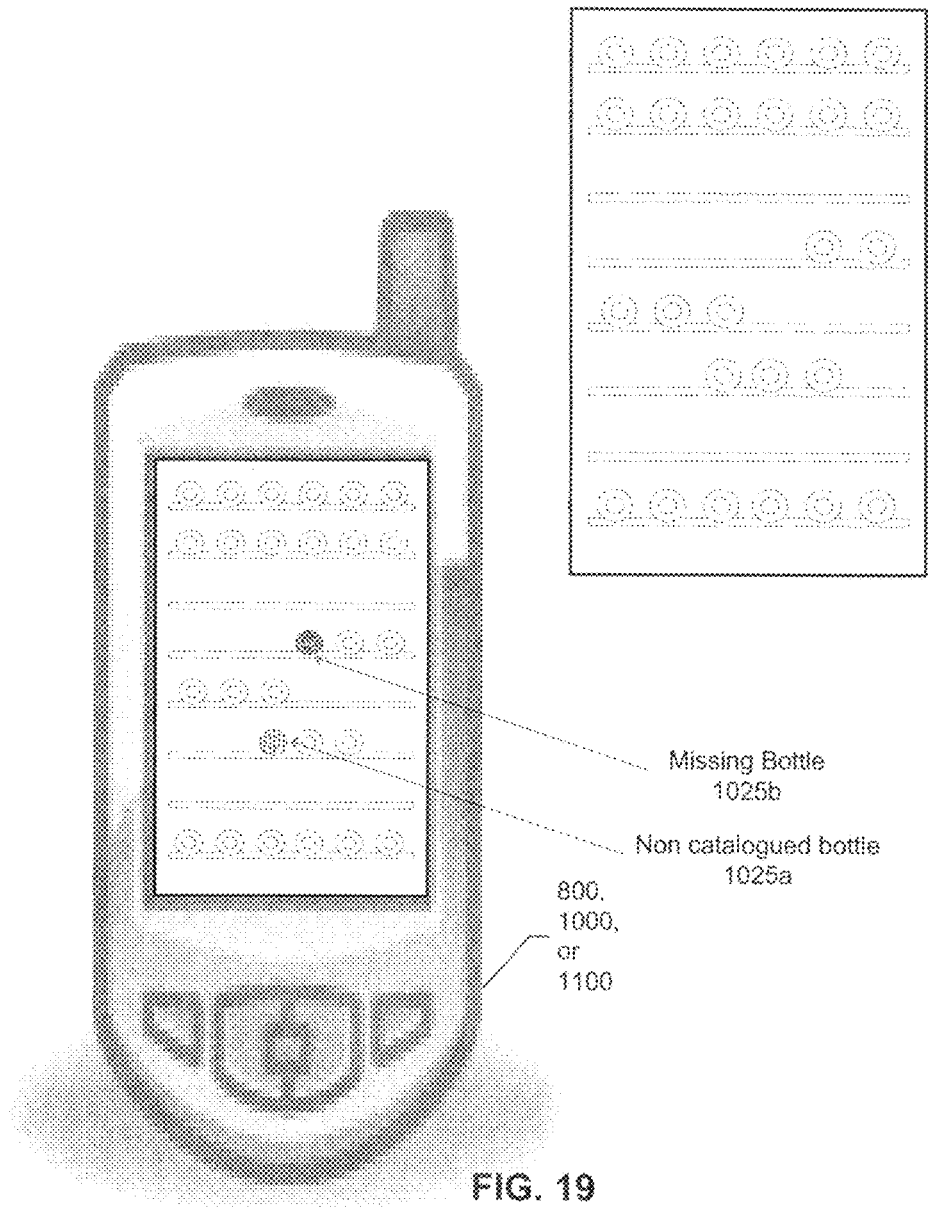
FIG. 19 is a pictorial representation of an embodiment displaying missing and/or non-cataloged images on a display device, an imaging device and/or a handheld device.

As shown in FIG. 19, one additional aspect of this system is that an imaging device 1000*a* could be taken of the wine cooler where at least some of the bottles are visible. This may or may not be the same imaging device 1000 as discussed prior. This image of the wine cabinet 100 could be used to find information gaps by comparing with the storage information (i.e. where bottles are expected to be) and highlight which bottles are not cataloged (e.g. bottle 1025*a*) as well as which bottles are not imaged as well as which bottles are "missing" (e.g. bottle 1025*b*). This system could assist in both cataloging wine and producing a log for insurance purposes. Furthermore where such "gaps" of wine bottles exists a user can be notified of the existence of the gap and be requested to add the missing information or image or alternative confirm that a "missing" bottle has been consumed or otherwise moved.

As also shown in FIG. 19, a viewing device 1200 could be use to provide "real-time" display of wine cabinet. This could be the same or different from image device 1000, display device 1100. It may be preferable for it to be a handheld device 800. Either a representation of wine cabinet 100 or an actual image of wine cabinet 100 can be displayed on the handheld device 800. Then representations of the bottles can be overlayed on the representation of the wine cabinet 100.

Alternatively, as shown in FIG. 19, a camera on the handheld device 800 can be directed at the wine cabinet 100. This can be done by directing the camera at the wine cabinet and then representations of the bottles can be overlayed on the image shown on the handheld device 800. This would provide a "real time" view of the wine cabinet and provide representative overlays of the bottles stored in wine database 825 and/or image database 1025.

Another aspect of the invention is that when consuming a bottle the user could be able to input notes, ratings and other similar information of the wine consumed (not shown). This may include the date, time and parties that consumed it. The user may also be able to record their personal feedback on various wines. Additionally another example is that if one of the user's companions or friends had an opinion of a bottle than can be recorded and then later recalled by the user when the same companion is present at a later date.

Another aspect of the system is that it may be used to order/replace consumed or missing bottles with similar bottles. Various rating and recommendation databases can be accessed to allow for a user to select from available bottles. These databases could be coupled with a separate image database discuss above or combined with the database to allow the user to virtually "hold" a bottle they may desire to order. The system than can facilitate the transaction so that user may acquire additional wine. These orders may be recorded and images of the bottle attached to ease the later recording of the new bottle into the system. The system may even recommend a location for the bottle to be stored based on storage temperature or grouping similar wines together (either based on type of wine, age of wine, cost of wine, other factors or combination thereof).

Furthermore, this system could facilitate an overall organization of a wine cellar based on any of the above factors and help a user "rearrange" their cellar or cabinet. The user could first virtually move the bottles to their new desired location within the representations on the system, and the system could then notify the user which bottles to move to which location. The system could additionally calculate moves to limit, or reduce the number of touches to either certain bottles (e.g. move valuable or delicate wines), or total number of moves required. Alternatively, the user could select from various arrangement of wine recommend by experts or desired by the user, and the system could calculate movement of bottles with in a cellar or cabinet(s) based on such arrangements.

Finally, it should be understand and appreciated that while aspects of this present invention are directed to identifying and interacting with wine bottles, but this invention could equally be applied to other bottles, including without limitation beer, whiskey, bourbon, scotch whiskey, and other alcoholic beverages.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An interactive system for use with a wine cabinet or rack to hold bottles of wine, comprising:
    a scanning device configured to identify a bottle of wine meeting a search criterion and located in the cabinet or rack;
    a wine database, wherein the wine database contains information about a plurality of wines;
    an image database, wherein the image database contains a plurality of images including an image associated with the bottle of wine;
    a display device configured to display information from both the wine database and the image database to facilitate identification of the bottle of wine and to allow for a user to view the bottle of wine in a simulated three-dimensional setting; and
    a communications device configured to send information associated with the bottle of wine to the cabinet or rack to form a first indicator on a transparent touchscreen door of the cabinet or rack showing a physical location of the bottle of wine in the cabinet or rack, wherein the image is a less than full image of the bottle of wine, and when the image is to be displayed by the display device, a rendering of a full image of the bottle of wine is shown by the display device by filling in the less than full image of the bottle of wine, wherein the image database is configured to create a filled-in portion, either at storage of the image or at a retrieval request by the display device, thus filling in the less than full image of the bottle of wine to create the full image of the bottle of wine wherein, when the full image of the bottle of wine is rendered on the display device, the full image is virtually rotatable so as to simulate a three-dimensional bottle, wherein the scanning device is further configured to take an image of the wine cabinet or rack, and the system is configured to compare the image of the wine cabinet or rack with stored information to identify unexpected bottle(s) which are present but not cataloged and/or expected bottle(s) which are cataloged but missing, and cause the communication device to send information for the identified unexpected and/or missing bottle(s) to form indicators on the transparent touchscreen door of the cabinet or rack notifying the user of the identified unexpected and/or missing bottle(s), and request that the user provide missing information for the unexpected bottle(s) and/or confirm that the missing bottle(s) have been consumed or moved using the transparent touchscreen door of the cabinet or rack.

2. The system of claim 1, wherein the scanning device identifies the bottle of wine by taking an additional image of the bottle of wine and identifying one or more characters and/or figures within the additional image.

3. The system of claim 2, wherein the scanning device and the display device are part of one device.

4. The system of claim 1, wherein the wine database and the image database are located on a storage device.

5. The system of claim 4, wherein the storage device is part of the scanning device or the display device.

6. The system of claim 1, wherein information about the bottle of wine from the wine database is related to the first image for the bottle of wine.

7. The system of claim 1, wherein the image database and the wine database are in a single database.

8. The system of claim 1 wherein the display device is a handheld device, and the handheld device comprises a smartphone or tablet.

\* \* \* \* \*